United States Patent [19]

Walter et al.

[11] Patent Number: 4,513,390

[45] Date of Patent: Apr. 23, 1985

[54] SYSTEM FOR DIGITAL TRANSMISSION AND SYNTHESIS OF INTEGRATED DATA

[75] Inventors: Gerard O. Walter, Potomac, Md.; William D. Sheppard, Lakeside, Calif.

[73] Assignee: Planning Research Corporation, McClean, Va.

[21] Appl. No.: 321,540

[22] Filed: Nov. 16, 1981

Related U.S. Application Data

[63] Continuation of Ser. No. 37,228, Jun. 8, 1979, abandoned.

[51] Int. Cl.³ .............................................. G06F 3/04
[52] U.S. Cl. .................................................... 364/900
[58] Field of Search ... 364/200 MS File, 900 MS File; 340/717, 716

[56] References Cited

U.S. PATENT DOCUMENTS

| | | | |
|---|---|---|---|
| 3,599,178 | 8/1971 | Jackson et al. | 364/900 |
| 3,961,324 | 6/1976 | Cousin et al. | 340/717 |
| 4,070,710 | 1/1978 | Sukonick et al. | 364/900 |
| 4,101,959 | 7/1978 | Domike et al. | 364/200 |
| 4,125,873 | 11/1978 | Chesarek | 364/900 |
| 4,202,041 | 5/1980 | Kaplow et al. | 364/900 |

Primary Examiner—Thomas M. Heckler

[57] ABSTRACT

An image acquisition subsystem, electronic processing subsystem and workstation subsystem produce information management networks that are almost unlimited in size and scope in integrating data and information stored in both digital form and in human readable form. Integration is by on-demand conversion in a scanner/digitizer of data and information to a transmittable, compatible electric signal which is encoded and converted into human readable form at the workstation of an information requester. The scanner rejects improperly oriented microfiche and recognizes microfilm data in a right reading or reversing orientation. An electronic circuit presents the data to the system's buffer in the right reading orientation regardless of a right or reverse reading input from microfiche. The scanner/digitizer regulates scanning speed in conformity with the data rate and capability of the transmission line to absorb the data. A microprocessor master module performs various functions with only minor hardware changes.

15 Claims, 14 Drawing Figures

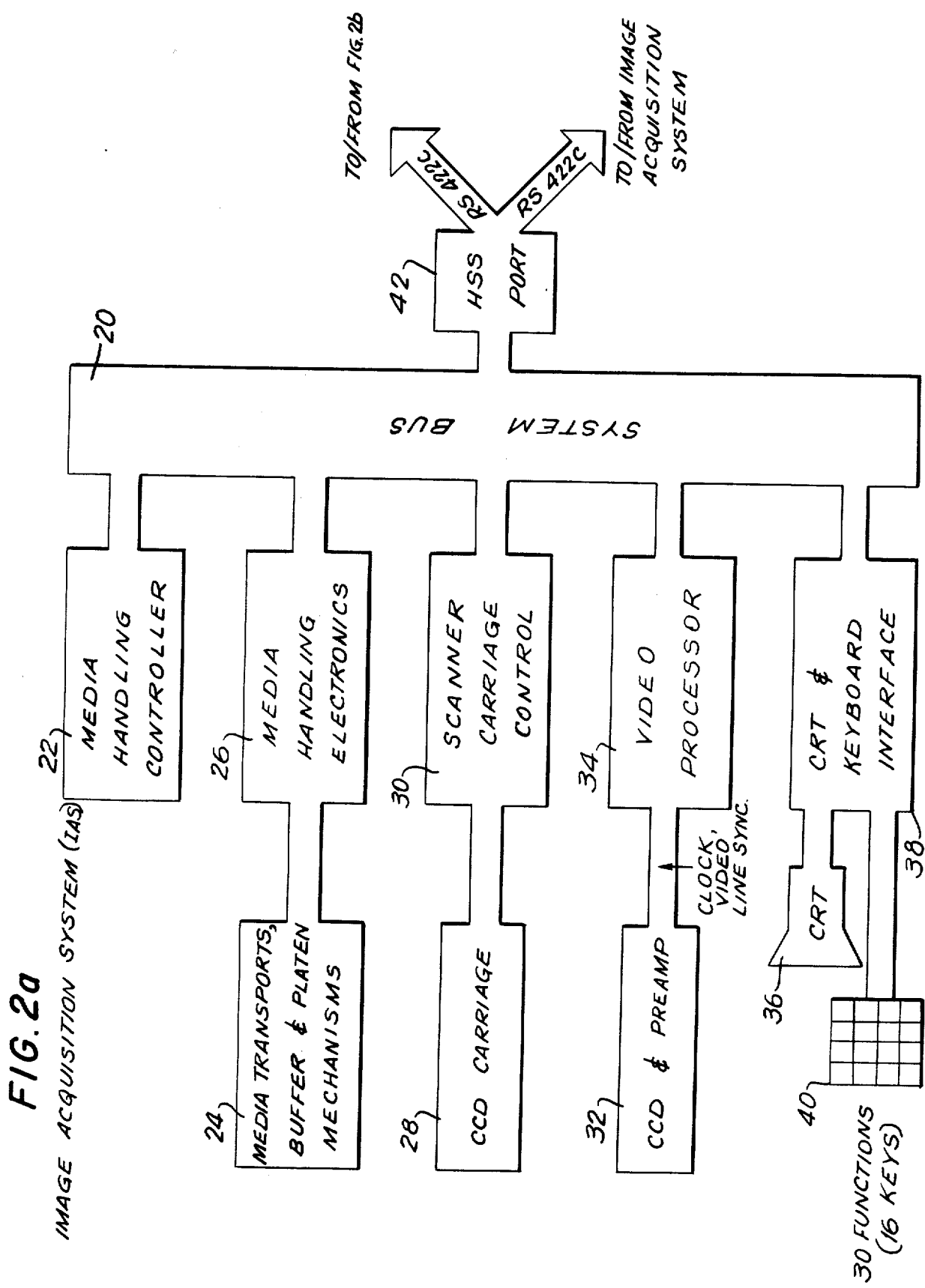

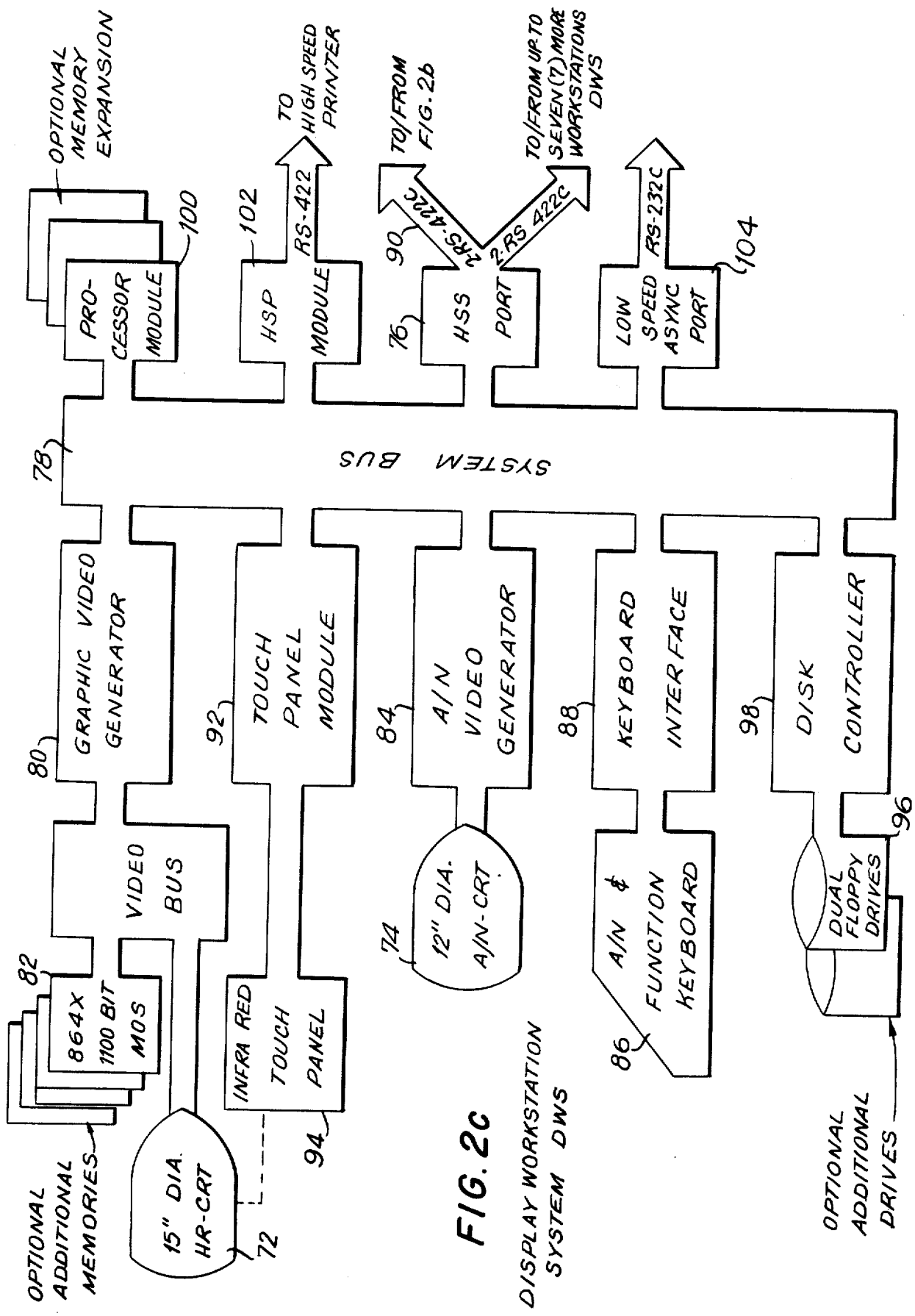

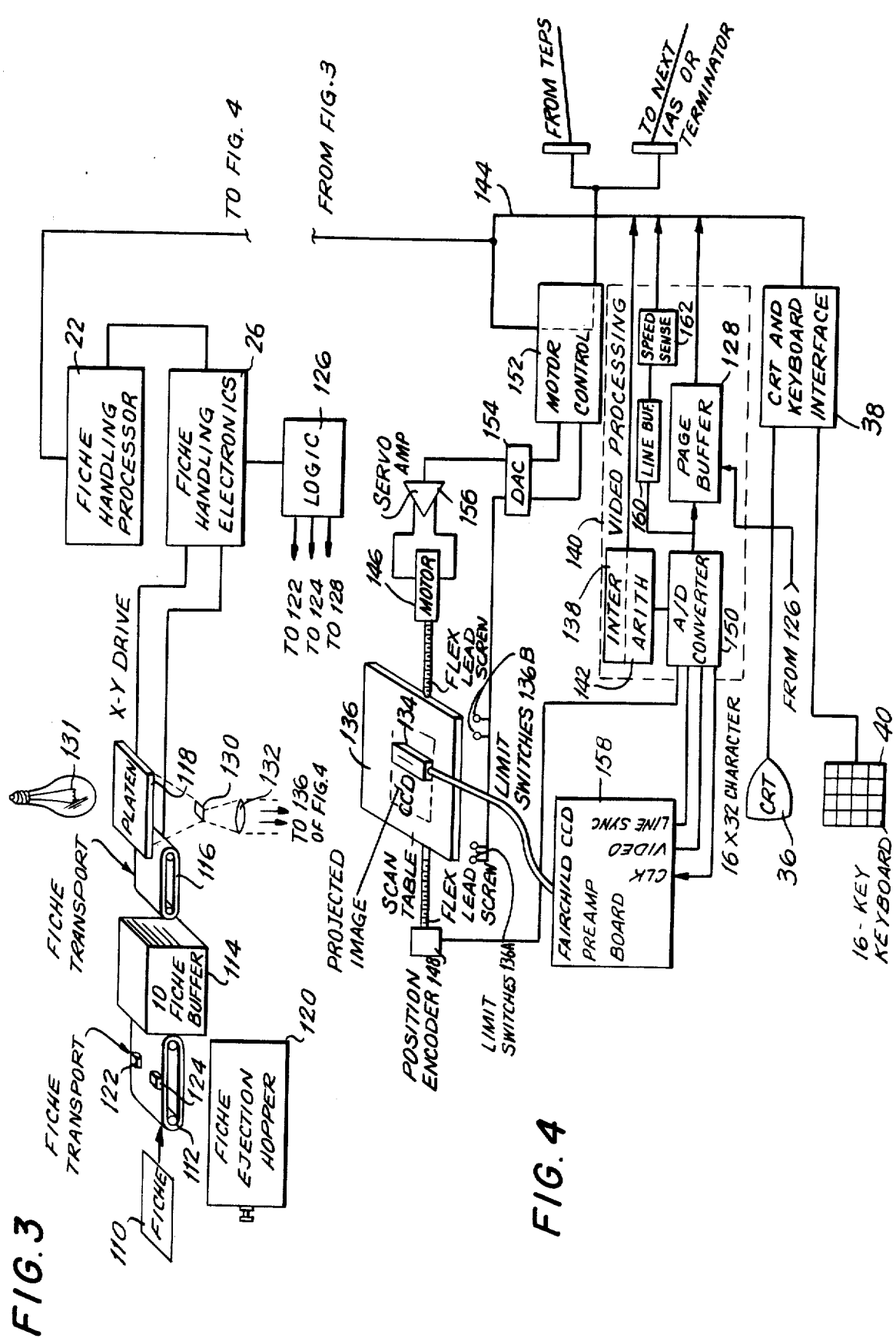

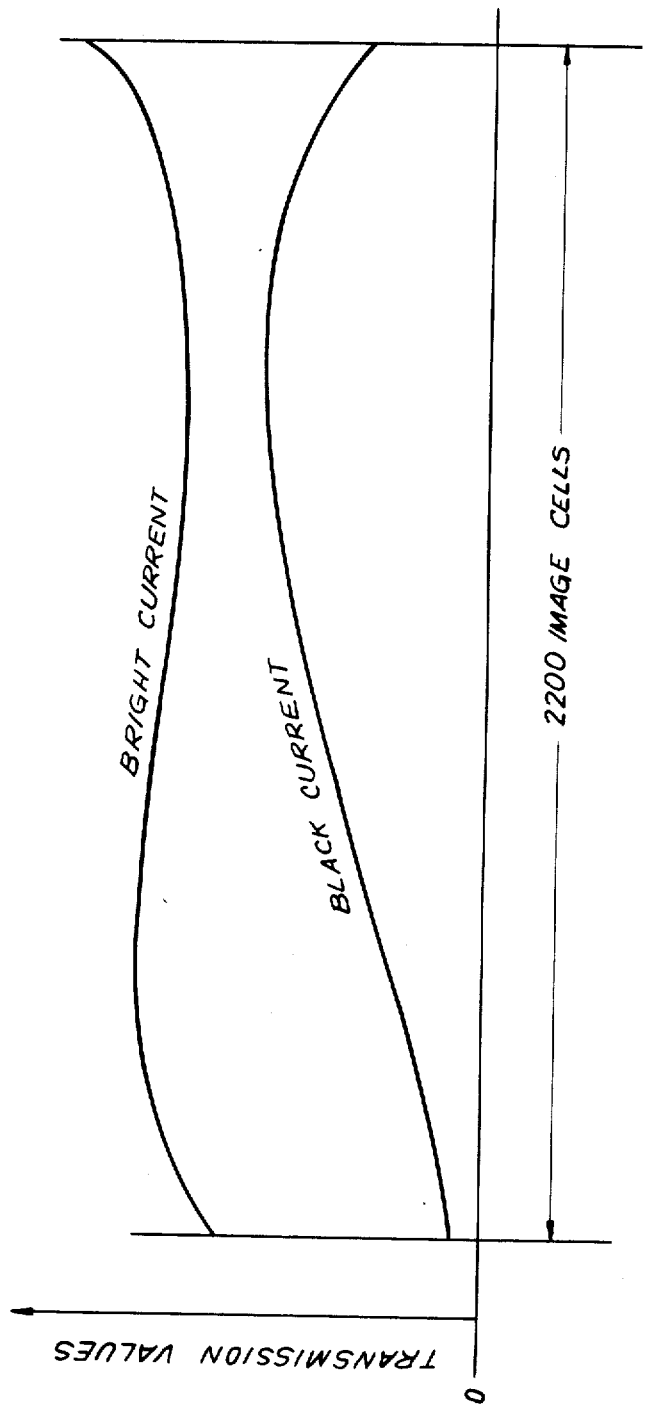

SYSTEM FOR DIGITAL TRANSMISSION AND SYNTHESIS OF INTEGRATED DATA

This is a continuation of application Ser. No. 037,228, filed June 8, 1979, abandoned.

BACKGROUND OF THE INVENTION

This invention relates generally to a system for digitally transmitting and manipulating or synthesizing integrated data and, more particularly, to a system for accessing intelligence or information from microform, computer and hard copy data bases and digitally transmitting, synthesizing and displaying the same in either hard or soft copy form.

As a result of the diverse nature of the activities that generate intelligence or information, a multitude of information storage media or data bases exist. Thus, hard copy data banks or record files exist which contain graphic information or data in human readable form. Such data banks include file folios, graphics, drawings, books, etc. Secondly, a vast amount of information is stored in machine readable or digital form in the memory banks of computers. Although much of this information is of a transient nature, a large proportion thereof has lasting significance and is permanently maintained in magnetic memories on discs, tape, etc. Finally, a significant amount of information is contained in micrographic data banks, this information being analogous to that contained in the hard copy data banks but are maintained in a size-reduced format stored on film by microphotographic processes. Such data is generally human readable with the aid of micrographic readers. Of course, information also exists in other miscellaneous forms such as, for example, photographs, large charts, etc. However, these latter data bases represent only a relatively small percentage of the total amount of stored data and may be discounted for the purposes of the present invention.

It is often desired to obtain information contained in one or more of the above described data bases at a location geographically remote from the actual location of the physical data base. For example, to this end, facsimile transmission systems whereby human readable data contained on hard copy documents are converted into electrical signals for transmission over existing communication channels, such as voice grade switchable telephone lines, digital data networks, wide band cable T.V. channels radio and microwave channels, etc., for transformation back into human readable form at the receiving or accessing end are known.

However, the most economical form for information storage on a massive scale is in human readable microimage form. Thus, source documents, such as business letters, scientific treatises, invoices, etc., are converted by micrography to microformed formats, such as microfiche, for economical storage. Additionally, it is common for computer compiled data of lasting significance to be printed on microfiche by COM (computer originated microfilm) machines. A need clearly exists for a system capable of accessing such diverse microfilm based information from locations geographically remote from the physical location of such data bases.

Further, as mentioned above, a considerable portion of active information is stored in digital machine readable form in the magnetic memories (core, MOS discs and tape) of ADP systems. Such memories are usually the essential management component of information systems. In the past such information has been extracted by the accessor addressing the information system computer by entering commands into a typewriter keyboard, which is usually associated with a video terminal. The request is usually made in a modified human language and the response from the computer is normally in human readable language appearing as alpha/numeric characters displayed on the screen of the video terminal. This display is constructed by the character generator in the video terminal in response to digital signal codes that the computer has selected and transmitted from the magnetic memories which are part of the computer system.

Thus, to be fully effective, an information management and distribution system should make available for access all information contained in the various data bases discussed above. Accordingly, information stored in hard copy form, in digital machine readable form and in micrographic form should be easily accessable. This is true regardless of where the various data bases are situated either at a common geographical location or are located at widely disparent locations throughout the world.

Moreover, an information management and distribution system, to be truly efficient from a practical standpoint, should also have the capability of rapidly transmitting information over existing communication channels without sacrificing legibility or content at the display terminal. In this connection, the limiting line in all communication systems is the band-width of the transmission channel. Thus, given the practical prerequisite of transforming and transmitting the document data in a computer compatible digital format, a method must be implemented to reduce the amount of digital electrical pulses to a minimum in order to facilitate both rapid and economic transmission of this data via available communication channels. For example, a voice grade dial-up telephone line (as avialable from the public telephone system) when activated via the appropriate tone generator (modem) can support, with present technologies, up to ninety six hundred digital pulses per second. However, a typical human readable document, such as, for example, a bill of lading when dissected into three million eight hundred thousand picture elements, each of which requires one electrical pulse for transmission, would require seven minutes for transmission over a voice mode telephone line. Such an extended transmission time renders this approach impractical and uneconomical in most applications. Thus, it is evident that means must be devised in order to reduce the amount of transmitted data per document page without sacrificing the content of the transmitted information.

Additionally, in various situations, such as where several analysts desire to access the information system from the same or different locations at the same time, without undue waiting periods, the transmitted electrical pulse-data which represents the converted human readable document must be suitable for being buffered or temporarily stored in computer compatible memories.

Further, it should be recognized that different information simultaneously desired at a particular time at a single location may be stored in a plurality of diverse data bases such as, for example, in micrographic form and in machine readable form in a magnetic memory device. Thus, a fully effective information management and distribution system must have the capability of synthesizing intelligence contained in diverse data bases for subsequent display in soft or hard copy form. In this connection, the system should, in addition to having the capability of displaying at the same time and on the same output terminal data stored in all active information storage segments of this system (including magnetic data, microform data and hard copy data) be capable of extracting, temporarily storing, recalling and displaying in intermixed fashion any portion of the accessed data.

In operation, any multisource media system should be designed so as to permit ease of expansion and modification. In addition, such systems should be flexible and permit total operator control over source and display format and location. Finally, system control features such as zoom capabilities and high resolution imaging are desirable.

It is therefore the prime object of the present invention to provide a multimedia source scanner and digitizer and an access and display or print-out terminal which can operate under the control of a computer for allowing an operator to access any source document and utilize same to print out or generate a new source document.

It is another object of the invention to establish a system using a microprocessor based sub-system framework facilitating ease of modification and expansion.

It is a still further object of the invention to provide a controllable communication system based upon a graphic data base and allowing complete user flexibility as to source and print out.

It is another object of the present invention to provide a graphic based system allowing communication between both remote source and remote display terminals.

It is another object of the invention to provide a solid state imaging system which will permit desired manipulation of visual data.

BRIEF DESCRIPTION OF THE INVENTION

The foregoing objects are achieved in accordance with the present invention by utilizing a plurality of source inputs and a plurality of data outputs, all under the control of a common computer operative along a common data bus. The source input and data output units are modularized, employing common microprocessor based sub-system, thereby allowing modification and expansion without extensive hardware and software changes. The use of such standardized system bus provides the electronic processing based system with modular expansion capability. Each image source transfers its data in the same format to every image sink. Thus, the addition or deletion of different image sources or sinks to systems of this type causes no retrofitting of any software or hardware except for address data. This allows the system designer a great degree of freedom in configuring and reconfiguring the systems. As an entity, the system is a complete graphics processing and communicating assemblage. The source inputs including hard copy, microfiche, stored memory machine language data from disc, core, or semiconductor memory, both transient and permanent, and direct operator entered data. The output is capable of expression in all of the same formats, and any one of a combination of format inputs can be transformed under operator control into any one or more of the same or different formats. In addition, communication data links enable data to be sourced or sinked from remote to remote, local to remote, remote to local, or local to local, all under operator control or direction.

In more detail, the novel features of the present invention utilize the following specific concepts.

1. The concept of integrating of data and information that are stored in both digital form on data processing equipment peripherals and human readable form in paper files, libraries and in human readable compacted form namely on microfilm. Specifically, this integration is accomplished by the on demand conversion of the data and information to a transmittable, compatible electric signal which is then encoded and converted into human readable form at the workstation of the information requestor.

2. Certain aspects of the embodiment of a scanner/digitizer, specifically, the ability of the microfiche image acquisition system (scanner) to reject microfiche that is improperly oriented then loaded into the input slot of this machine. This also includes the capability of this scanner to recognize if the microfilm data on the microfilm emulsion is in the light reading or reverse reading orientation. Finally, a electronic arrangement to present the data to the system's buffer always in the right reading orientation regardless of the right or reverse reading input from the microfiche. Another aspect of the scanner/digitizer is its ability of regulate each scanning speed in conformity with the data rate and the capability of the transmission line to absorb the data.

3. The concept of modularity and specifically the creation of a microprocessor master module which is used repeatedly in all these systems in substantially the same form. To make this master module perform various functions only minor hardware changes in the IO portions are required and most of the changes are carried in the firmware.

4. The creation of a system consisting of three subsystems. One subsystem is the image acquisition system. The second subsystem is the electronic processing subsystem and the third subsystem is the workstation subsystem. Using these three subsystems as building blocks, information management networks can be configured that are almost unlimited in size and scope.

DESCRIPTION OF THE DRAWINGS

The foregoing brief description will become more apparent from the following more detailed description, and appended drawings, wherein:

FIGS. 2a, 2b and 2c are together a detailed system diagram showing the interrelationship of the specific components of the image acquisition system, electronics system and display system of the present invention;

FIG. 3 is a further description of the image acquisition system portion of the present invention;

FIG. 4 is a detail of the scanning system employed with the present invention;

FIGS. 5a, 5b and 5c show graphic wave forms of the data reduction technique of the present invention;

DETAILED DESCRIPTION OF THE INVENTION

Figure 1:
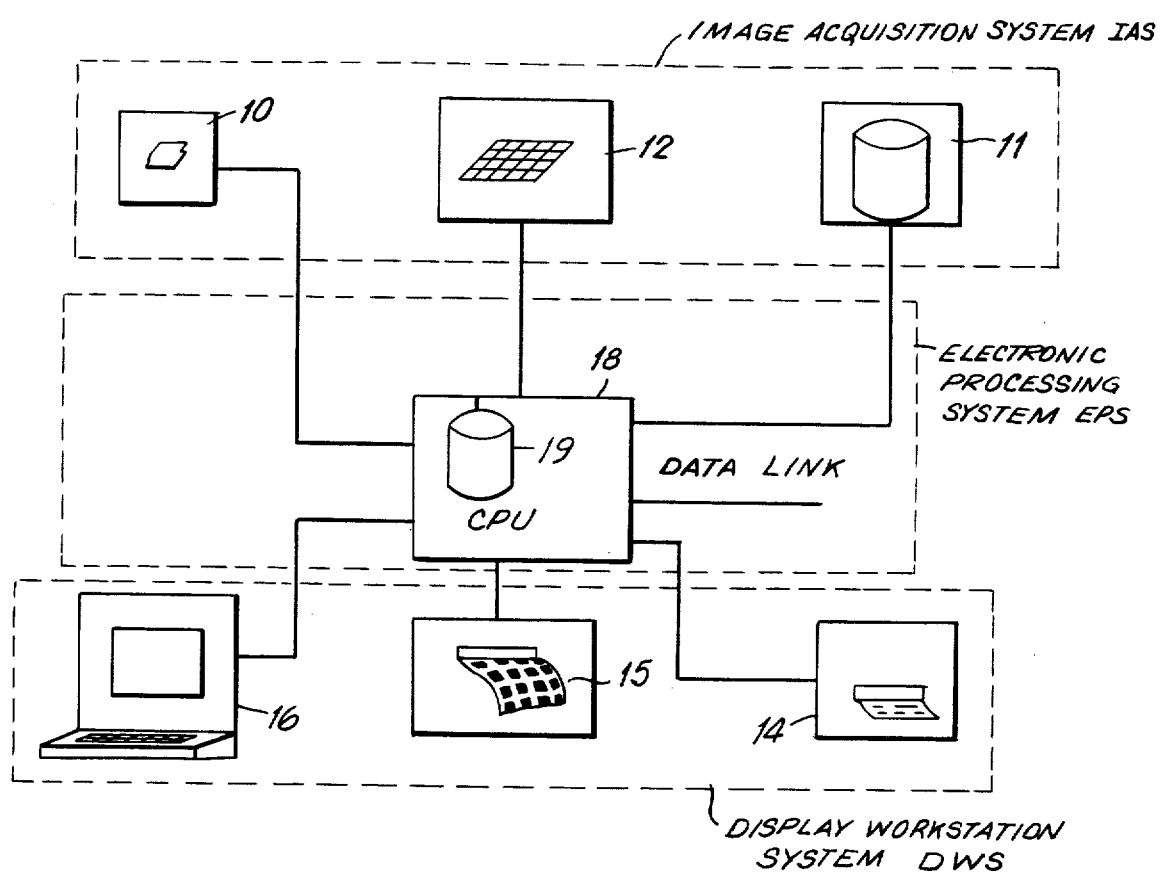
FIG. 1 is a general system diagram.

An overall system for illustration of the operative interrelationships of the present invention is shown in FIG. 1. The essential system configuration employs an image acquisition system IAS, an electronic processing system EPS, and a display workstation system DWS. The operational control of the system is under the overall control of a central data processing unit interacting with an appropriate access terminal for synchronizing the various aspects of both image acquisition and image processing. With respect to image acquisition, multisource media may be employed. For example, a document scanner and digitizer 10 operate to receive and scan hard copy documents for the purpose of generating digital information representative thereof. Similarly, a micrographic scanner and digitizer 12 operate to mechanically retrieve microfilm or microfiche data, and scan same for presenting a series of digital signals for processing. In addition, a data bank consisting of magnetically stored alphanumeric and/or graphic data can be addressed to retrieve and present selected images and/or data packets in the form of compatible digital signals shown as element 11.

With respect to image processing and output, a high speed hard copy printer operative from digital input is shown as element 14 and a soft copy or display terminal such as CRT or the like is shown as element 16. Element 16 also includes a keyboard which may be employed as an access terminal for accessing any of the various elements representing multisource media and for directing the operation of the communication systems. This keyboard at times is also used to generate new inputs to the system and therefore the element 16 at times can also be considered as belonging to the group of image acquisition elements such as element 10, 11 and 12.

Also operative in accordance with the invention is a computer-originated microfilm printer 15 which acts to generate microfilm in accordance with digital signals inputted thereto. Control of the entire operation is under the auspices of a general data processing device 10 which both responds to and transmits digital signals to each of the various terminal devices discussed. The data processor 18 may also respond to access from the keyboard on the terminal 16. Additional memory utilized for mass storage, programming data, and buffering if necessary, is stored in the appropriate memory device 19. The data processor 18 also includes a data link which may be employed for transmitting data from any one of the multisource media to a similar system remotely located. The data link operates in accordance with conventional technology for the transmission of digital data in accordance with any of the digital information derived for transmission purposes. This data link is also used to transmit to or receive transmission data from other information systems and particularly other computers that administer digital data banks.

The system thus described shows an information storage/retrieval system using multimedia source scanner and digitizers in combination with a display and access terminal and a digital controller. The scanner-digitizer, and display and access terminal, are connected to the digital controller and the digital controller responds to a first series of entered instructions on the access terminal for digitizing any of the multimedia sources either singly or in combination and to a second series of entered instructions on the access terminal for displaying and/or reproducing the sources either singly or in combination. The principal advantage of the present system is the employment of a single terminal to enable the user to generate a new source document from a plurality of original sources, such as a hard copy, microfiche, digitally stored data or directly entered data in order to produce new documents which may then be either transmitted on the data link, reproduced into hard copy, reproduced into microfilm and generated onto an appropriate microfiche, or merely displayed for informational purposes.

Figure 2B:
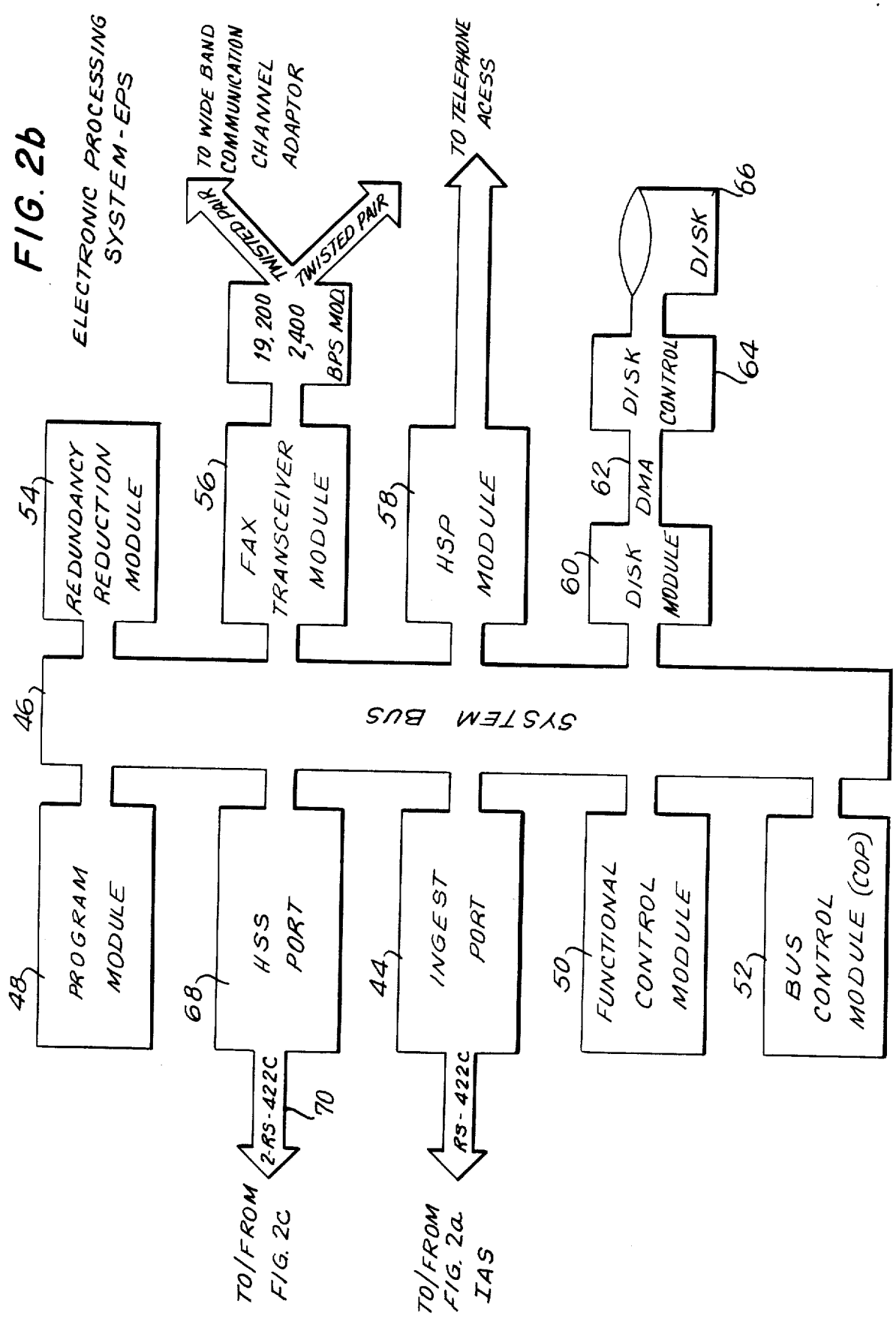

With reference now to FIGS. 2a, 2b and 2c, a complete graphic image processing system employed within the general concepts described in conjunction with FIG. 1 is discussed in greater detail. Within the graphic image processing system, several separate and distinct process steps are performed. First, conversion of a graphic image. Second, enhacing of the electrical signal resulting from the conversion of the graphic image. Third, the transmission of the digital data stream. Fourth, the delivery of the image in the form of a soft display or hard copy. Separate functional hardware and firmware modules are used for these functions and to handle the various input and output configurations.

The graphic image processing system includes several groups of modules. The image acquisition systems IAS, FIG. 2a, electronic processor system EPS, FIG. 2b, and an output or display workstation system DWS, FIG. 2c.

Taking each of these elements in turn, the image acquisition system IAS consists of a material handling mechanism and an image to video converter or scanner. Various forms of the image acquisition system are capable of handling diverse media such as microfiche, roll film, aperture card, and paper or hard copy documents. Microfiche and roll film handlers may also include storage and retrieval sections. Aperture card handlers will be equiped with input hoppers as will hard copy or paper scanning units. The image acquisition system IAS may include a plurality of modules. Typical are image acquisition systems for paper documents at 1:1 size, and microforms (microfiche, microfilm and aperture card) at 1:18, 1:20, 1:24, 1:42, 1:48 or any other reduction ratio. Data from a plurality of modules is either fed and processed serially or pooled line-by-line by the electronic processor system EPS, FIG. 2b.

With reference to FIG. 2a, the image acquisition system IAS is illustrated in conjunction with the acquisition of a block of digital data representative of a particular media, such as a microfiche. The IAS employs a common system bus 20 and has several electronic and electromechanical modules interfacing therewith. These include a media handling controller 22, operative to control a media handling mechanism 24 through its associated electronics 26. As will be explained in further detail below, scanning in this acquisition system is accomplished through the use of a charge coupled device, and the carriage 28 and its associated control 30 are also coupled to the system bus. The electronic coupling to such charge coupled device includes a preamplifier 32 and an associated video processor 34 which includes clock circuitry and video line synchronization as elements thereof. Command display for the operator and status messages appear on a CRT 36 which also provides along with its associated keyboard, interface electronics 38 and the multiple function keyboard 40 a means for systems operation by originating command inputs by the operator. The output of the system bus is coupled through a high speed port module 42 along appropriate interface coupling lines employing the standard RS-422C interface. These interfaces couple to the electronic processing system EPS, as shown in FIG. 2b.

Turning to the electronic processing system module EPS, the output from the image acquisition system IAS is applied along the input interface RS-422C to a serial ingest port module 44 for coupling of the data to the electronic processing system bus 46. Also coupled to the system bus 46 is a program module 48 which may be designed for the specific use, by the user of the equipment, for setting up a desired sequence of operations peculiar to the user's requirement. A functional control module 50 is also coupled to the system bus for controlling priority of operation between the various output modules coupled to the system bus. A further bus control module 52 is also coupled to the system bus for handling bus contention problems, within the bus itself. A redundancy reduction module 54 is coupled to the system bus 46 and is employed for converting the bit-serial graphic data to a run-length encoded (redundancy reduced) compact data stream. Various output functional interfacing modules can be coupled to the electronic processing system. Thus, a fax receiver module 56 is coupled to the system bus 46. A high speed data transfer module 58 is coupled to the system bus 46 and interfaced to an RS-422C interface for coupling data to a high speed printer. Finally, a disk module interface 60 may also be coupled to the system bus 46 and is coupled with direct memory access through a link 62 to a disk controller 64 and then to the actual disk transport mechanism 66. The electronic processing system further provides for high speed serial data transfer through a high speed serial port 68 and associated RS-422C interface 70, for coupling to the display workstation system DWS, shown in FIG. 2C. Each of these modules are microprocessor based, as set forth in greater detail in FIG. 7.

While the actual number of microprocessor modules that are employed will vary depending upon the number of image acquisition systems and output systems that are controlled, the basic system is as illustrated in FIG. 2b. It is evident that the physical space availability of the electronic processor may well be limited by the number of graphic images permitted at the peak of image acquisition or output, thus determining how many input or output devices can be serviced by the single electronic processor system bus 46. Bus extenders and direct memory access bus-to-bus interfaces may be implemented to house several justapositioned electronic processors in a single large equipment rack.

Referring to FIG. 2c, three basic output modes are utilized in accordance with this graphic system. First, soft display. Second, paper hard copy. Third, film output (fiche and roll rilm). A film output may be accomplished via a graphic computer originated microfilm (COM) processor. The COM processor equipment is conventional and may be utilized in accordance with standard technology. In addition, the output systems employ a dual function workstation illustrated generally in FIG. 2c and including a high-resolution graphic display screen 72 and an alpha-numeric display screen 74. The display screens 72 and 74 are coupled and interfaced via video generators 80 and 84, respectively, for removing data from the system bus 78. Access to micrographic information through a storage bank is preceeded by an on-line interactive exchange between the operator and the digiral data bank system supervisor. In use with high resolution CRT display systems, it has been found that high resolution graphics cannot be displayed efficiently on CRT's designed for alphanumeric display. In addition, alphanumeric display on high resolution graphics require special character patterns such as $15 \times 21$ dots rather than $5 \times 7$, and finally split screen displays often require large and high resolving CRT screens that are not available except on special order and at high expense. Resolution of this difficulty was the incorporation of the aforesaid two display screens or CRT's into a single workstation area. The first graphic display CRT, 72 may be a high resolution (1200 line) unit displaying into a $8\frac{1}{4} \times 10\frac{1}{2}$ window, thereby presenting an $8\frac{1}{2}" \times 11"$ document at 95% size. The second graphic display CRT, 74, is an alphanumeric display screen typically displaying 24 lines by 80 characters with a $5 \times 7$ dot matrix into a $7" \times 5"$ window.

The system of FIG. 2c is a dual workstation. The workstation is connected to the electronic processing system EPS through the high speed serial channel port 76, which interfaces with the module 68 shown in FIG. 2b. The high speed serial port 76 handles receipt or communications from the electronic processor module EPS of both image data and alphanumeric data. The image data is transferred via the local system bus 78 from the high speed serial port 76 to the video generator interface 80. The video generator interface 80 includes a video bus 81 and can store the images in the video generator memory 82. This can be employed to generate a high resolution image for display on the high resolution 15" CRT 72. The alphanumeric data received by the high speed serial port 76 is transferred to the alphanumeric video generator 84 for display on the 12" alphanumeric CRT 74. Data from the alphanumeric functional keyboard 86 is transferred to the high speed serial port 80 via the keyboard interface module 88. The high speed serial port 76 sends the keyboard data back to the electronic processing system EPS via the high speed serial channel 90.

The touch panel control unit 92 gives an XY coordinate position of the location or of a finger or similar object interrupting the infrared light matrix 94 which is projected across the front of the 15" CRT screen. This XY coordinate information is read by the high speed serial port 76 and transmitted to the electronic processing system EPS. Other means for effecting communication with the front of the 15" CRT 72 may also be effected, such as light pens or other interactive graphic devices as are well known. All information into or out of the work-station passes through the high speed serial port 76. Image data transfers are handled on a DMA basic while all other transfers to other elements in the workstation are handled on a programmed basis. A vertical workstation can include a graphic high resolution CRT oriented to display an $8\frac{1}{2}" \times 11"$ document with the 11" in the vertical direction. This workstation is for display of the images scanned in the 24 magnification image acquisition unit. A horizontal workstation can include a graphic CRT oriented to display an $11" \times 14"$ document with a 14" dimension in the horizontal direction. This workstation is for the display of images scanned on the 48 magnification image acquisition system unit. It will be understood that each workstation includes two screens, one high resolution graphics CRT and the other an alphanumeric CRT.

The display workstation system DWS also includes floppy disk drives 96 interfacing with a disk controller 98 to the local system bus 78. Additional controls can be provided with a processor module 100 for controlling bus priority traffic between the various outputs along the system bus 78 and to house and apply special operating firmware instructions which expand the workstation capability as a free standing business/workprocessing computer system.

Additional outputs include a high speed data module 102 for interfacing the system bus 78 with a high speed printer and a low speed asynchronous port 104 with a standard RS-232 data link, for such devices as TTY or the like.

Turning now to the system operation, the foregoing system is based upon a modularized microprocessor system. The main controlling electronics of the system are contained within the electronic processing system of FIG. 2b, including the system bus 46, bus controller 52, and the basic processing module 50 which controls the transfer of command, status, and image data between various application modules residing on the system bus. Most application modules are of two generic types, image sources and image sinks. An image source application module is one that will provide data to an image sink module via data transfers across the system bus. By way of example, several application modules shown in FIGS. 2a–c are listed below as to their generic classification.

| IMAGE SOURCE | IMAGE SINK |
|---|---|
| 1. Ingest Module | 1. Printer Module |
| 2. Facsimile Module | 2. Disk Module |
| 3. Disk Module | 3. High Speed Serial Module Work Stations |

The disk and facsimile modules are both image source and image sink modules. There is one application module that is neither an image source or an image sink module, and this is the program module 48. The program module 48 controls the man/machine interface with respect to the system operator. The operator communicates with the program module from the workstations via the high speed serial module 58 along the system bus 46. Upon determining the requirement for a certain system operation such as image scan, image print, image display etc. as a result of operator input, the program 48 module passes the appropriate commands to the basic processing module 50 which in turn directs the execution of the desired operation.

Each module in the electronic processing system EPS consists of a local microprocessor which interfaces with the system bus 46 via a standardized bus interface. In addition to the usual bus interface, and local microprocessor, each application module has a customized input/output (I/O) section which provides the required interface to an external system element such as a printer, work station, scanner etc. Under control of the basic processor module 50, image data is transferred directly between image and sink modules. The actual transfer including handshaking, acknowledgments and data transfers, occur via the system bus 46 between the two application modules in communication. Since each module has its own microprocessor, it will have the ability to command bus usage and control the data transfers into and out of local memory. System bus data transfers proceed on a direct memory access (DMA) basic from the local memory of one module to the local memory of another.

Thus, it will be seen that standardized system bus architure provides the electronic processor with modular expansion capability. Since every image source transfers its image data in the same format to every image sink, the addition or deletion of different image sources or sinks causes no retrofitting of any software or hardware in the system except for the updating of the address table of currently resident modules. This allows the system designer a great degree of freedom in configuring and reconfiguring the system.

The various modules will be described in terms of their functions and basic hardware elements.

1. Image Acquisition Unit

FIGS. 3 and 4 are block diagrams representing both mechanics and electronics of a exemplary image acquisition system. By way of example, the media described is set forth in a preferred embodiment of a microfiche handler. It will be understood of course that this is merely one example of a document handling process, the same process equally applicable to hard copy or other forms of graphic data.

Referring to FIG. 3, the fiche movement is controlled by means of ASCII input from the DWS via the EPS through the high speed part 42 to the image acquisition bus 20. The ASCII code couples to the fiche handling processor 22 which in turn decodes the ASCII signals and provides appropriate energizing signals to the fiche handling electronics 26. As a result, the fiche 110 is caused to move upon the fiche transport 117 into a 10 fiche buffer 114. The purpose of the fiche buffer in this embodiment is to allow the system to operate with a minimum of intervention by a human operator, since the buffer will accept up to 10 fiche which may each have a continued number of 2,700 frames or even more, and the logic will store a great many executions and commands. On the average, the operator will load or unload three to five times per eight hour period. The fiche transport 116 places the fiche onto the platen 118 which in employed for the purpose of scanning the document as will be described in conjunction with FIG. 4. After scanning, the fiche moves back onto the fiche transport 116 into the 10 fiche buffer 114 and will be ejected into the fiche ejection hopper 120 by the controller when the fiche is not further needed. During this time, the fiche handling processor 22 continues to receive commands from and sends status to the electronic processing system EPS via a dedicated full duplex serial ASCII channel.

A conventional form of the foregoing microfiche handler is manufactured by Photometrics Corporation of Santa Monica, Calif. Several improvements and modifications have been added to this fiche handling device, as will be described in further detail below.

As shown in FIG. 4, elements 120 and 122 are two light sensing devices which are positioned in the film transport device 112 in conjunction with any appropriately position light source. These sensing devices are configured to be able to sense the presence or absence of a microfiche by the reduced amount of illumination which falls on the sensing device when the microfiche enters between the light source and the sensing head of the sensor. All microfiche handled by this fiche handling device will-be conforming to the National Microfilm Association standards, which are also the standards of the ANSI. This standard requires that the microfiche which is a sheet of film approximately 148 millimeters wide by 105 millimeters deep has a corner cut in the microfiche title area. This cut corner location is on the left side of the leading edge of the microfiche in the microfiche title area, when the microfiche emulsion faces the observer. In addition, this standard also requires that each microfiche shall have a cut mark in the lower microfiche margin approximately 32 millimeters from the left hand margin which is the margin that also has the cut corner. This cut mark is a black square of approximately 3×3 millimeter size.

This invention permits the use of various generation microfiche. Generation of microfiche is defined as a measure of the remoteness of the copy from the original document. The camera film image made of the document is called the first generation microfilm. Copies made from this first generation are called second generation, and copies from the second generation are called third generation, etc.

The ability to handle various generation microfiche is very important. Normally the first generation or camera film microfiche is only used as a printing master for making subsequent generations or second generation microfiche. This printing master first generation is valuable and usually kept in a separate secure file. The second generation microfilm is used as the working copy. Often the second generation microfiche is again used as a printing master and a third generation microfiche is made and used as a working copy. This is particularly often the case if the microfiche is obtained from another source which mails out or distributes copies from their second generation working fiche.

When contacting printing copies are made the resolution or quality of the copy is always diminished from the resolution or quality of the master from which it is printed. This reduction in quality is small if the process is done properly and insignificant so it can be discarded. However, the reading orientation changes every time a contact print is made. With the emulsion facing the observer the first generation or camera copy is normally reverse reading. The second generation made by contact printing from the film master will then be right reading. A definition of right reading is: orientation of text or images in normal sequence for reading, even if the material is rotated from an upright position. Right reading is the opposite of reverse reading, which describes a mirror image.

Since the microfiche must be entered into the platen 118 with the emulsion facing the CCD 134 to obtain the proper resolution, all odd numbered generations such as 1, 3, 5 and 7 will present a right reading orientation to the CCD and all even numbered generations such as 2, 4, 6, etc. will present a reverse reading orientation to the CCD. The reading orientation, however, must be automatically rectified to be the same for the different generation microfiche so that at the output end, namely at the hard copy or soft copy generation equipment always right reading copy is produced. To solve this problem the following embodiment is used: first it must be assured that the operator loads the fiche 110 into the fiche transport 112 with the emulsion facing down. It can be seen that if a microfiche that has been produced to the NMA and ANSI standard is always loaded into the film transport 46 with the cut off corner of the microfiche to the right hand side of the operator then the film emulsion will always face down. The sensors 122 and 124 are arranged with a logic that senses the leading edge of the microfiche. The sensor 122 must see the leading edge, namely, the uncut corner first since sensor 124 is arranged in line with 122 and the cut of the corner interrupts the light beam falling on 124 several milliseconds later, when the interruption occurs at the sensor 122 by the uncut leading edge of the microfiche. The mechanism 126 is so arranged that if the sensors 122 and 124 are either interrupted at the same time or if the sensor 124 is interrupted before the sensor 122 is interrupted the fiche transport mechanism 112 reverses itself and automatically exits the fiche 110 again which is an indication to the operator that he either tried to load a nonstandard microfiche which does not have the corner cut or that he may have tried to load a standard microfiche in a rotated orientation.

Turning again to the ANSI standard microfiche it will be noticed that the cut mark on the lower edge of the microfiche for the camera film, first generation, is 32 millimeters from the leading edge. For second generation microfilm however, since the image is rotated, this cut mark now appears approximately 116 millimeters from the same leading edge. The sensing logic 126 in the fiche handling mechanism is so arranged that the sensor 122 after sensing the leading edge of the fiche starts a clock running which measures the time interval from sensing the leading edge to sensing the cut mark. Since the microfiche travels at a predetermined speed in the fiche transport the time values are known at which the cut mark has to be sensed for odd generation microfiche or for even generation microfiche. This intelligence now directs the manner in which a line buffer in the scanning sequencing mechanism is being emptied. When the CCD scans the image on a line by line basis, it always starts the image scan at the left hand frame margin and scans bit by bit until it reaches the fight end frame margin. Each scanning, after being converted from analog to digital data is temporarily stored in a one line buffer for right reading copy. This buffer then is emptied to the disk or transmission line in a first bit in-first bit out manner. If, however, the logic has recognized that the scanner is viewing a reverse reading copy the line buffer is emptied on the bisis of first bit in-last bit out, effectively rotating the scan direction by 180° and converting reverse reading copy into a right reading copy. The logic for effecting this operation can be derived from the logic circuit 126, the signals from which are coupled to the buffer 128, shown in FIG. 4. In another preferred configuration, this operation is effected in the microprocessor system of the ingest part shown as element 44 in FIG. 2c.

Referring to FIG. 3 the platen mechanism is shown in greater detail. This XY platen mechanism 118 is of the conventional type. The multiple element fiche is positioned on the platen 118 on a frame-by-frame basis, and will stop over the projection aperture 130 so that the image frame which is in the aperture is illuminated from sources 131 and projected by the scanning lens 132 into the scanning path of the CCD 134 as the projected image above the surface of the scan table 136, as shown in FIG. 4.

The platen mechanism which is preprogrammed and under the control of a microprocessor will place the microfiche frame in the scanning aperture strictly based on a theoretical measurement basis. The center of the frame as measured from the edge of the microfiche is again subject to the microfiche standard. However there is sufficient locational centering tolerance permitted in these standards that valuable scanning resolution would be lost if the scanning is so arranged to scan the total possible tolerance circle of the fiche location which is at least 10% larger than the actual microfilmed document whose image is in each individual frame. A resolution loss of at least 10% would be encountered for those microfiche which are produced strictly to standards. However, since some of the commercially produced microfiche exceed the tolerance of image location, it is feasible that in a certain percentage of microfiche part of the image would come to rest outside of the scanning aperture and therefore would not be seen by the scanner and the data would be lost. To overcome this difficulty, automatic sensing capable of correcting the fiche location in the aperture has been incorporated into this embodiment. This correction device operates under the following principles: before scanning a microfilm frame, which is always done by moving the CCD 134 from the top edge of the frame through its length to the bottom, the CCD 134 is moved in the reverse direction. Thus, the CCD 134 is started from the bottom of the frame and scans to the top. A logic interrogating device 138 incorporated in the video processing circuits 140 is used that examines the output of the first 24 CCD elements in the CCD scanning strip. It is these scanning elements that would see the edge of the documents and would show a pattern, e.g., of the first through the fourth cell seeing bright light and the fifth through the twentieth cell seeing black if the document edge were located in the proper proportion to the edge of the scanning aperture. The logic output of the analyzed CCD pattern of the first section of the CCD is coupled to the X and Y drive of the platen 118 through the output line 142 to the processor 22 and electronic 26 and the platen is moved slowly as required in the X or Y direction correcting the skewed position of the image until the proper edge location is recorded by the CCD.

To accommodate skewed documents the platen movement is delayed until all measurements of the CCD have been completed and have gone through an arithmetic unit 144, also included in the video processing circuit 138, which averages the distance of the document edge as measured at the bottom and the top of the document determining the average distance that the platen has to be moved so that the middle of the document is positioned in the right location without cutting off either the top of the lower part of the document edges. At optimum setting of the control mechanisms the total correction cycle as described is completed in approximately ½ of a second. After the film image is properly centered in the scanning aperture the basic scanning process may begin.

The basic method of converting the image of a graphic document into transmittable electrical signals is to disect the image into a multitude of individual equi-sized image cells using the CCD device 134 in FIG. 4. Each cell is examined to determine if it either transmits or does not transmit light. The examination of the image cells is organized in accordance with a rigid, fixed discipline. With reference to FIG. 4, and starting at the upper left corner of the scanning area (the frame that contains the entire page of graphic information) the image is examined by proceeding along the narrow edge of the page by sequentially examining cell by cell (No. 1, 2, 3, . . .) until the opposite edge is reached. The distance between these two edges is divided by the predetermined number of cells. The preferred configuration divides this distance into 1728 cells. The CCD 134 is thus provided with 1728 individual sense elements.

The 1,728 sense points represent one line scan with a sensing resolution of approximately 200 sensing cells per inch of the 8.5 inch wide document. This line scan will be repeated 200 times per linear inch of document depth, namely 2,200 times for an 11 inch long document. As will be shown below this is accomplished by physically moving the CCD 134 through the projected image area of the document. The result of scanning with a 1,728 element sensor 2,200 lines per document is the generation of 3,801,600 picture elements. Each of these image cells is examined for transmittance of light in a sequential process by projecting an evenly illuminated image field into the disected sensing plane and using the microform image carrier, that contains the document page, as a mask between the illuminant and the sensor array. Each sensor converts the light energy that is transmitted through the image cell, that the sensor is associated with, into an electrical current that is proportional to the amount of light energy that falls on the sensor. Since the sensing is arranged as an orderly sequential process, and only one cell is sampled at any given time, the total output can be visualized as a wave train of uniform wave length and differing amplitudes. The uniformity of the wave length is given by the predetermined uniform size of the image cells and is modulated by the uniform dwell/discharge regulated by the internal sensor array clock. The different amplitudes are a consequence of the differing amounts of light energy that is passed by each image cell.

The method chosen for disecting the image into the individual cells is based on the use of a linear sensor array 134 of 1,728 charge coupled sensing elements and by traversing, by the physical motion of driving the scan table 136 and its linear array through the sensing field, while the mask (microform) and all other opto-mechanical components are stationary. Limit switches 136A and 136B limit the movement of the scan table at the limits of the source document. In an alternate configuration, it is possible to keep the mask (microform) and the linear array stationary and the projection lens physically translated at 90° to the optical axis and paralled to the long dimension of the image frame, thus causing the image of the mask to travel by the linear array. Other configurations are possible, such as a pair of optical wedges, rotating with the optical axis as the rotational center points to traverse the image by the linear array. Also, a folded optical path, with one or more mirrors that are tilted, to move the image by the linear array can be used. It is apparent that the method that is employed to expose the entire scanning field to the linear sensor array is immaterial.

The sequential scanning of the individual 1,728 sensor cells along the sensing line is accomplished rather rapidly as compared to the travel speed of the CCD through the image projection. The relative motion of the CCD 134 is practically nil. To repeat the line sensing 2,200 times during its travel from the top of the document to the bottom of the document a separate location sensing device is used to determine the location of the CCD relative to the projected document image at any particular time during the traveling cycle. In a preferred configuration, the CCD linear sensor array 134 is attached to the scan table 136 and this scan table is driven by a variable speed drive via a lead screw which rotates and drives a captive nut which is attached to the scan table. Every rotation of this lead screw drives the table 136 by a known amount of distance commensurate with the pitch of the lead screw. One end of said lead screw is attached through a flexible coupling to the drive shaft of the variable speed motor 146. The other end of this lead screw is attached with a flexible coupling to the input shaft of an angular resolver 148. The angular resolver is a state of the art component which generates electrical impulses every degree or fraction of a degree of its shaft revolution. By using this device and counting the pulses generated by it the scanning logic keeps precise trace of the location of the CCD 136 at any time during the scanning. By choosing the proper lead screw pitch and the angular resolver it can then be arranged that for instance every 360° rotation of the lead screw advances the CCD by 1/6 of the distance from the top to the bottom of the projected document image which means that to traverse the total distance the lead screw will have to be rotated 6 times. Since the total number of scan lines is 2,200 each sixth of the travel accomplished by a single lead screw revolution requires 366 strobings of the scanner or approximately 1 strobe actuation per degree of rotation as indicated by the angular resolver. This preferred configuration is of course only one way of accomplishing the precise strobing of the line scan and its advantage is that this method does not require a precise or uniform travel and does not place great precision requirements on the uniformity of the motor drive as long as the lead screw precision is fairly high. Precise lead screws of course are much less expensive than precisely timed motors. This method also has the advantage that as will be discussed below it makes it possible to vary the speed of scanning and still warranting the precise location of the strobing. Another method of actuating the strobing of the lines would be to drive the scanning element at a precise and constant speed and actuates the scanning pulses by a time division clock circuit.

The speed of scanning theoretically is only limited by the cycling speed of the CCD and by the sensitivity of the sensors in the array. The sensitivity of the array is measured by the efficiency and amplification of the conversion of the time integrated light energy between the sensing (discharge) cycle. The amount of light energy that can be pumped through a small image area is limited by the tolerance of the material to the heat generated in the blocking (absorbing) areas. However, since the scanning is accomplished for the sole purpose to convert on-line the analog wave train to a digital square wave train and to store the digital data temporarily in a memory, the real and practical limitation of a useful scanning speed depends on circuit speeds and bandwidth consideration.

Once recognizing that for all practical applications the data rate is the limiting component of the scanning speed, implementations to reduce the amount of data transfer to the absolute minimum can be used, while, of course, maintaining the scanner's ability to recognize and resolve small details. Naturally, the amount of data can be reduced by choosing larger image cells which results in a lesser number of cells per page and less data, but also reduces the ability to recognize small details in the grahic image.

An examination of the relationship between the required number of image cells and the size of the graphic data components (i.e. height and line-width of printed letters) reveals that the smaller and finer the graphic data components, the greater the number of required image cells to resolve the graphic elements. More specifically, the greater the number of color transitions per scan line, the more image cells are required. For example: in a 6.5 inch long line of typewritten (⅛ inch height characters) text, there are on the average 224 transitions from white (background) to black (character body). In the same 6.5 inch long line of footnote (1/16 inch height characters) text there are 1040 transitions. And a scan line through the white space, in the space between lines, shows 0 number of transitions. In the space between the transition borders, defining a transition as the change from white to black or black to white, it is noted that the number of image cells per scan line must equal at least the number of transitions. Actually, the required number of image cells (the size of the image cells) depends on the average distance between the transition cycle white-black-white. In an example with 224 transitions, it was noted that when scanned on the basis of 1300 image cells per 6.5 inches, the smallest white-black-white cycle encountered contained 6 black image cells and the smallest black-white-black cycle contained 9 white image cells. If this same scan line would have been analyzed on the basis of image cells of twice the size, namely only 650 image cells instead of 1300, no transitions and no significant data would have been missed and the number of transitions would have remained the same. In the case of the 1040 transitions, analyzed on the basis of 1300 image cells, it is noted that a significant number of the white-black-white cycles were less than one image cell wide and the smallest black-white-black cycle was 2 image cells wide. With the proper gate setting, in the analog-to-digital conversion, this detail can still be resolved with 1300 image cells, but would be lost if the number of cells is reduced (if their size is increased) since the number of transitions would have been reduced.

The conclusion of this investigation is that the size (inversely proportional to the number) of the image cells, that are needed to resolve the graphic details, is related to the minimum distance between the white-black-white transition cycle for any given type of copy.

When further considering the known methods of code-compaction of data, it becomes apparent that a significant reduction of data (without loss of detail) requires a reduction of redundant transitions per page, rather than a reduction of image cells per scan line. As will be illuminated below, a significant data reduction (in addition of what is commonly practiced by known compaction methods) requires the reduction in the number of scan lines per page rather than the reduction of the number of data elements per scan line.

By known methods of "run-length coding" the 1300 image cells which are identified by one bit per cell (per above example) can be reduced to about 600 bits, which includes the 224 transitions. On the average, an image area of 6.5×8 inches if scanned at 40,000 cells (200×200) per square inch, on the basis of 1300 image cells per line and 1600 lines per 8 inch copy depth, would contain 2,080,000 image cells with about 224×800 transitions, which is 179,200 transitions. This data (uncompacted 2,080,000 bits) would compact to approximately 600×800 bits which is 480,000 bits.

However, if on the basis of the examination of the average 6 bits per smallest transition cycle, the decision is made to drop every other bit and every other scan-line, the number of image cells per line would reduce to 650 and the number of scan lines reduces to 800 with a total bit content of 520,000 and a transition count of 224×400=89,600. Assuming a less efficient compaction since the number of transitions is high (compaction factor of 1:2.5 rather than 1:4.3) the final data count would still only be 208,000 digital bits, which is an additional 1:2.3 reduction or a total reduction efficiency of $4.3 \times 2.3 = 1:9.9$.

The above-described considerations now make it possible to implement a scanning system that adaptively selects the most efficient number of image cells, for maximum resolution of detail at minimum data generation, which in effect is a variable resolution-scanning process. By automatically selecting the most efficient raster on a scan-line by scan-line basis, an effective variable resolution scanner has been implemented. The resolution is automatically determined by the amount of detail contained in each line of the copy. This variable resolution-scanning method, when supported by the proper coding in the leader message to indicate the resolution used, and in conjunction with known data compaction methods, such as run-length coding, is a most efficient compaction method for graphic data transmission.

All of the above-discussed methods of compacting the data, which has been implemented in a preferred configuration, has the effect of turning the synchronously-generated data into asychronous data bursts. Particularly with run-length encoding the amount of data generated per scan line is totally dependent on the amount of white-black-white transitions in each particular scan line. This asynchronous behavior of the data string is inconvenient and wasteful during transmission which operates most efficiently at the synchronous data rate at close to the maximum supportable baud rate that the line can accept. The conventional solution in the state of the art transmission technology is to buffer the spurious data onto a scratch pad type of intermediate buffer and then to transmit at synchronous rates out of this buffer into the transmission line. Buffering devices suitable for the high data rate in large data volumes use expensive MOS buffers. Since the document even after redundancy reduction may still contain several million bits and since MOS buffers cannot be used for simultaneous writing and reading, a practical system may have to contain a minimum of 6,000,000 bits organized in two separate MOS buffers. This requirement adds a considerable expense to a scanning system. The preferred embodiment of this invention solves this costly problem by providing a much smaller MOS buffer 160 (g. 4) of approximately 10 scan lines. Electronic circuitry 162 is employed that senses the speed at which this 10 line buffer empties into the transmission line and feeds back a speed up or slow down command, through the motor control 152, digital to analog converter 154 and servo 156, to the scanning carriage 136, maintaining the buffer properly filled and maintaining thereby a uniform synchronous data rate a maximum efficiency of the transmission line. The implementation in addition to the above-described variable resolution scanner also results in a variable speed scanner.

Referring again to FIG. 4, in a different embodiment, a charge coupled device (CCD) 134 such as the Fairchild CCD 121H is mounted on a mechanical carriage 136 to transverse a projection plane that is filled with the projected image of a microform frame. The output (video) from this 1728 sensor monolithic device is sampled 2200 times at equal increments during its approximately 2 second travel time through the long dimension of the projection field. The analog video output is converted into a binary digital data string in an analog-to-digital unit 150 (as described below) generating 1728 digital bits per line and a total of 3,801,600 digital bits per document page. This output is stored in an MOS (CCD) type page buffer memory 128 which is used as a one-page buffer. The data is withdrawn from the memory line-by-line for transmission. The one-page buffer of the uncompressed digital scan data enables the device to transmit data at slower-than-scan speeds, commensurate with the bandwidth of the terminals. It also allows the folding-in of the mechanical selection time for the next image, which can go on during transmission of the last image, thereby significantly increasing the through-put capability.

The scan data is withdrawn from the page buffer 128 scan-line by scan-line. Each line data is analyzed in accordance with the techniques described above.

The scan table is driven by a servo motor 146 which receives its speed control from the 8 bit digital analog converter 154. The converter 154 is controlled by 8 bit bytes analog the input control line through the motor control block 152. A positive voltage from the digital-analog converter 154 will drive the scan table from top to the bottom of the image whereas a negative voltage will drive it back to the top of the image. Orthogonal direction may similarly be controlled although it is not shown. The CCD sensor 134 is located above the scan table 136. The motion of the scan table 136 moves the image in the image plane allowing the CCD 134 to sense the entire image. As the CCD is thus moved relative to the image, the position encoded indicates to the video processing electronics how often to accept a scan line from the CCD. A total of 2,200 scan lines may be taken as the CCD moves through the image. The CCD is driven directly by the pre-amplifier board 158 which is a standard Fairchild product sold in conjunction with the Fairchild CCD imaging device. The video signal from the preamplifier board 158 is further processed and digitized by the video processing logic as was described above. The digitized video is then sent serially to the EPS where it is converted into a data stream parallel and transferred to an appropriate destination module via the local system bus 46.

One additional function of the digital video processing logic is image enhancement. This function will be explained in further detail after the following more general description.

An examination of a representative sample of the various microforms, that may be presented to a scanner, reveals the diversity of this material. A wide disparity exists in the size of the image areas, as a consequence of the different reduction ratios, employed during the microfilming. This disparity is of little consequence as long as it is recognized that different scanning optics and a different number of image cells per microform frame can be used in the scanning process, naturally requiring different physical scanner configurations.

A problem solved as a part of this invention is presented by the following existing conditions:

(a) The quality of the micrographic material, that is commonly used in micrographic image storage systems, varies with respect to the evenness of the light blocking characteristics of the "opaque" areas (background) and with respect to the evenness of light transmittivity of the "translucent" (data) areas. These variations are present, when measurements are made, not only comparing various microforms to each other, but also when measuring transmission values in different spots within a single microform frame.

(b) Microforms are produced on different, photo-sensitive emulsions (mainly silver halide, diazo dycoupled and vesicular/dispersion) and these materials are available from a number of manufacturers and in grades that produce microforms with a wide variety of light transmission characteristics.

(c) The light transmission characteristics of microforms are greatly influenced by the microfilming and subsequent chemical processing steps. A great variety of quality factors are the result of minor process variations.

Since the choice of the microform material and the microfilming process is not under the control of the disclosed Information Resources Management and Communication System and since, to be practical, the system must work with the existing microforms (produced to commercially accepted quality standards), it has been discovered that enhancement methods must be employed to correct the image defects. The following is an explanation of the various enhancement methods that are claimed as a part of the invention.

Figure 5A:
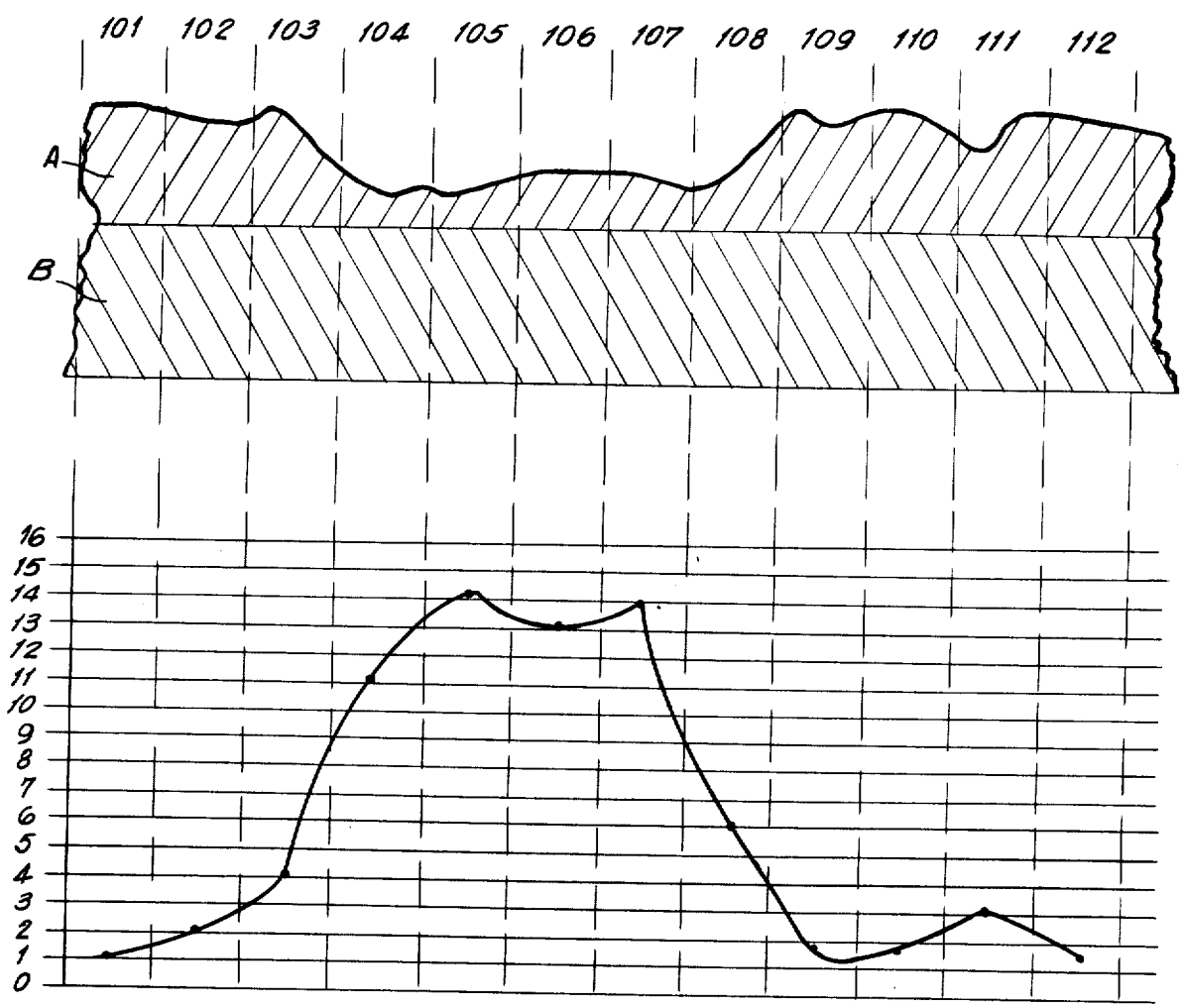

FIG. 5 represents the cross-section of a small image area of a microform. A represents the light blocking emulsion and B represents the transparent film base. The thickness of A and B is not drawn to scale. Actually B is usually from 10 to 20 times thicker than A. The vertical broken lines represent the sense areas (labelled 101-112) On a scale 0-16 the transmission values for light have been plotted. Transmissivity is an inverse function to the emulsion thickness. The light values are not necessarily on a linear scale. In this graphic example it is noted:

(a) The base (lowest) transmission value is between 1 and 2. We term this value the "black current value". This value changes for different materials and is dependent on the microfilming process.

(b) The high (maximum) transmission value is 15. We term this value the "bright current value."

(c) The values between 2 and 15 are the grey-scale values that are converted to binary values 0 or 1 (0 is chosen for background/no data and 1 for data area) by a gating process in the analog to digital conversion.

The following table of conversion values can be constructed:

| GATE SETTING AT T-VALUE | IMAGE CELLS | | | | | | | | | | | |
|---|---|---|---|---|---|---|---|---|---|---|---|---|
| | 101 | 102 | 103 | 104 | 105 | 106 | 107 | 108 | 109 | 110 | 111 | 112 |
| 2 | 0 | 1 | 1 | 1 | 1 | 1 | 1 | 1 | 0 | 1 | 1 | 0 |
| 4 | 0 | 0 | 0 | 1 | 1 | 1 | 1 | 1 | 0 | 0 | 0 | 0 |
| 11 | 0 | 0 | 0 | 0 | 1 | 1 | 1 | 0 | 0 | 0 | 0 | 0 |
| 13 | 0 | 0 | 0 | 0 | 1 | 0 | 1 | 0 | 0 | 0 | 0 | 0 |

Figure 5B:
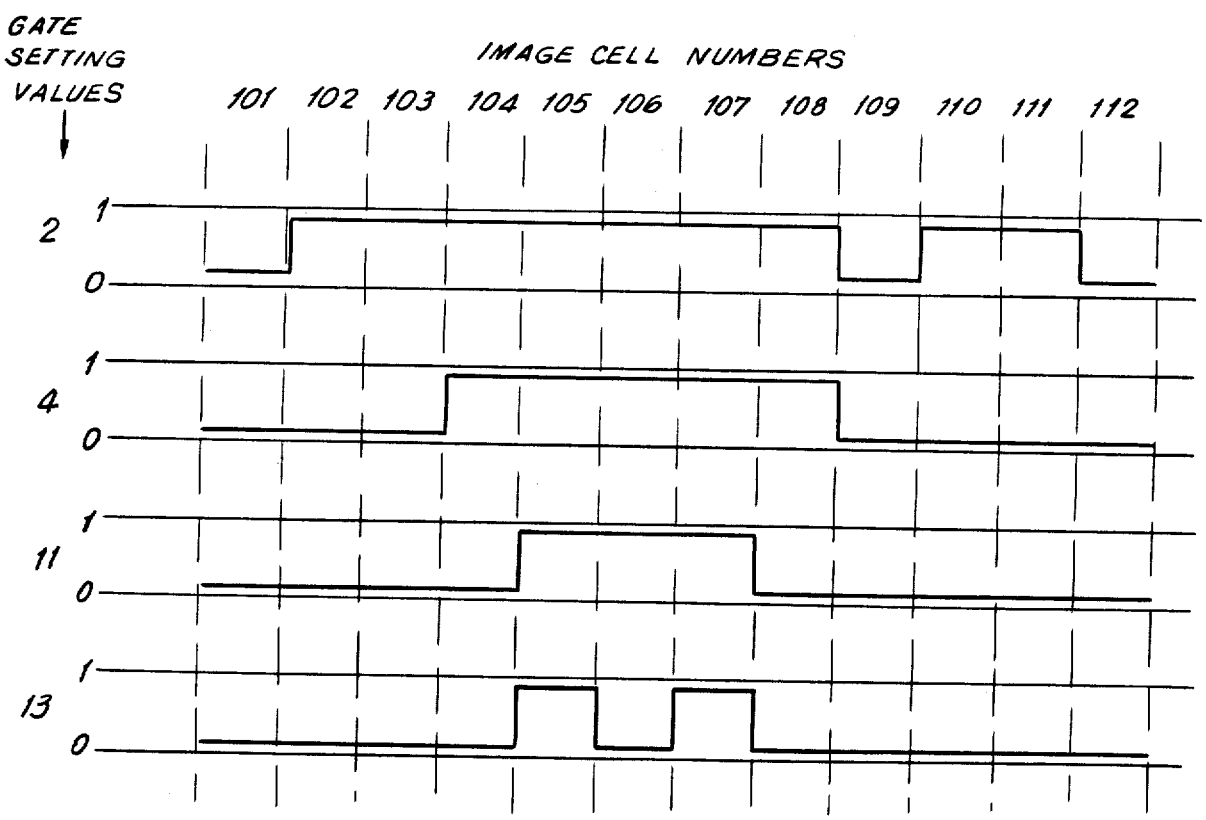

As can be seen from the above table, the width of the data lines (represented by "1") depends on the gate setting value. The graphic representation of the binary wave train at these gate settings is shown in FIG. 5b. It is illustrated that the setting of the gate value has the following effects:

(aa) it enhances the image, as shown in the setting at values between 4 and 11 by either including the transition lands in image cells 103 and 108, or by excluding them. Inclusion favors black and widens lines, excluding favors background and narrow lines.

(bb) reduces the number of transitions (from 1 to 0 and 0 to 1) which reduces the amount of data that has to be transmitted (as explained above in paragraph 5).

If all of the microfilm were of equal quality as far as the transmittivity is concerned a fixed conversion gate setting could be used. However, as indicated above, the transmittivity in both the black current and the white current areas vary widely, not only between different materials (emulsion types) but also from frame to frame and even within each frame.

FIG. 5c shows the smoothened light values for the black current and bright current output from a typical microfiche, using a checkerboard test sample.

The transmission curves show the increased illumination on the edges of the paper document during microfilming and the effect of light fall off in the microfilm lens and the scanner optics. To correct this common problem the following inventive correction and enhancement mechanism was utilized:

The analog (video) to digital conversion in element 150 is accomplished in two steps and with an adaptive gate value setting. First the video output is converted to one of 16 steps (4 bit code) of the gray-scale. Next the reduction to the 0 and 1 code is done by comparing each successive image cell with the last black current cell which acts as the "0" 1 gate value and recognizing a "1" as being two or more grey value steps above the "0" gate value.

Figure 6:
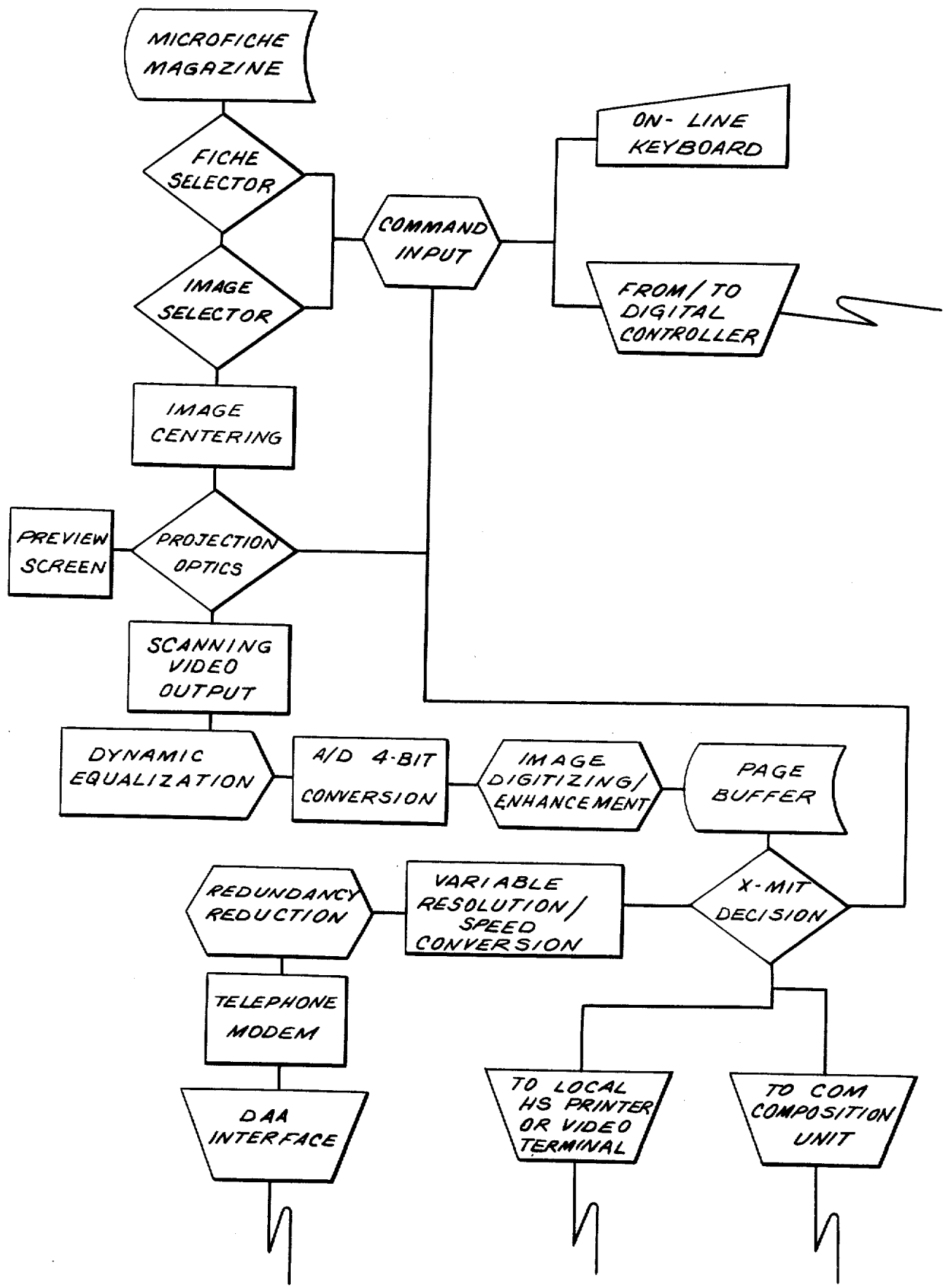
FIG. 6 is a flow chart of the operation of the image acquisition system.

In FIG. 6 there is shown schematically the flow interaction of the digitizer of FIG. 3. The fiche handler will preferably have the ability to store in a magazine 100 microfiche of standard NMA configuration. Depending on the chosen reduction, each microfiche can contain from 98 to 420 frames whereby each frame is the micrograph of one document page. Each microfiche can also contain a machine-readable (bar-code) identification number. This identifier is read by a suitably arranged sensor when the microfiche is loaded into the individual compartments of the fiche magazine. The identification number is then associated with the magazine compartment number and both terms are stored in the device controller memory. If the transmitter is controlled from a digital controller, the individual page identifiers may also be stored in the controller memory. When the user (analyst) enters a request from an on-line keyboard he may call for a particular microfiche by fiche identification number or for a particular document page by attribute or number (depending on the organized of the index). This command input can be made from any one-line keyboard that is connected to the system. The fiche selector withdraws the fiche from the magazine and places it onto an image selector platen. The image selector transports the fiche so that the requested image is placed over the projection aperture. The image centering scheme corrects the image position.

Depending on the accessor's choice the image may be previewed by optical projection a the preview screen or projected into the scanning field. Part of the scanning process is the dynamic equalizer process, the conversion to digital gray-scale and the conversion to "0" and "1" bits with the associated image enhancement. The resulting approximately 4 million bits are stored in the page buffer 128.

Depending on the accessor's choice, the image data is now transmitted from the one-page-buffer 128 to the system. If transmission over narrow-band (such as voice grade phone) lines is directed, the image data is redundancy reduced. As the data is withdrawn from the one-page-buffer the resolution (number of horizontal scan lines) is determined in accordance with the data density per line. The resulting data stream is then further reduced by the standard redundancy reduction (run-length coding) method.

2. The Electronic Processor Module

Figure 7:
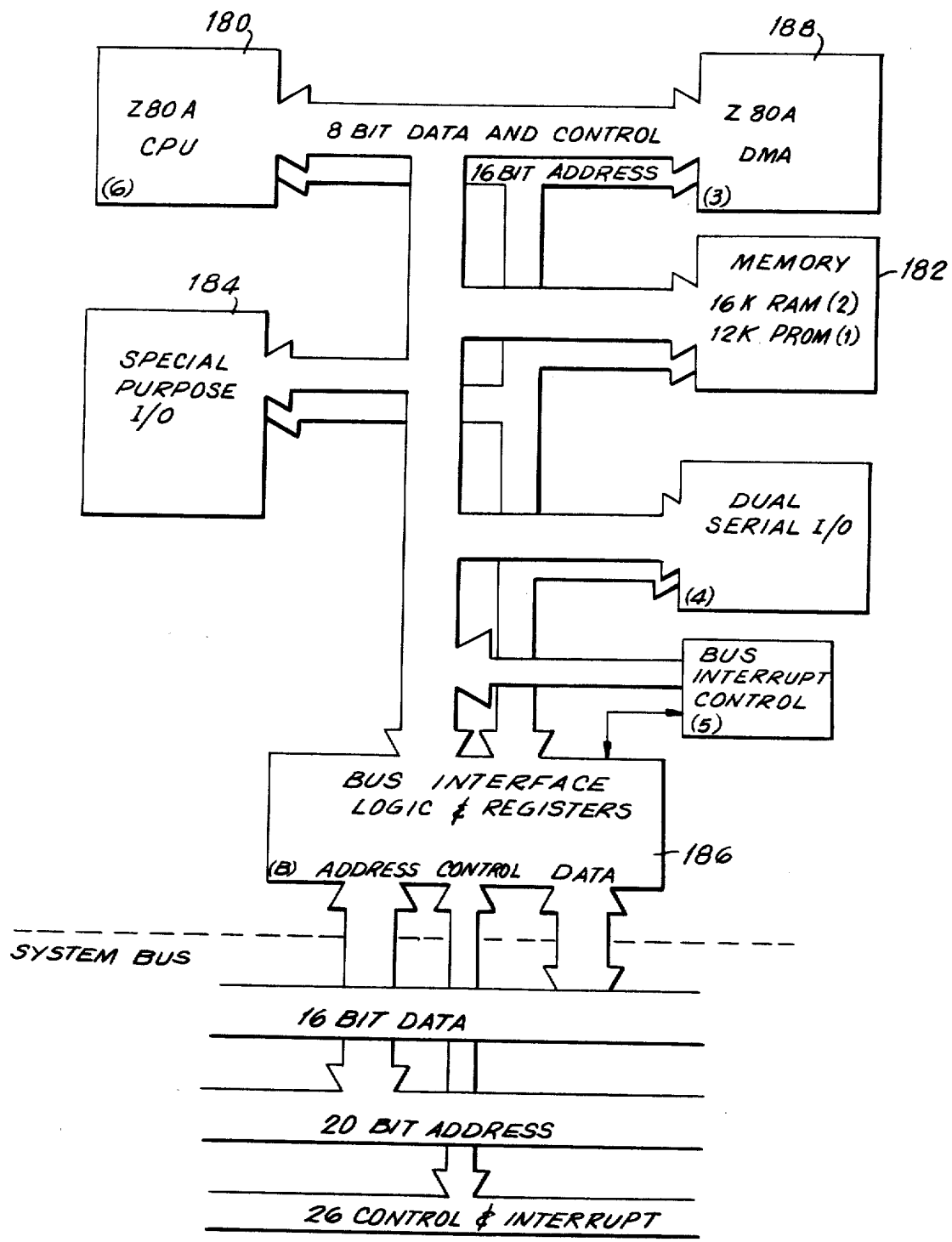
FIG. 7 is a detail of a typical single board adaptable for use as any one of several sub-system components.
Figure 8:
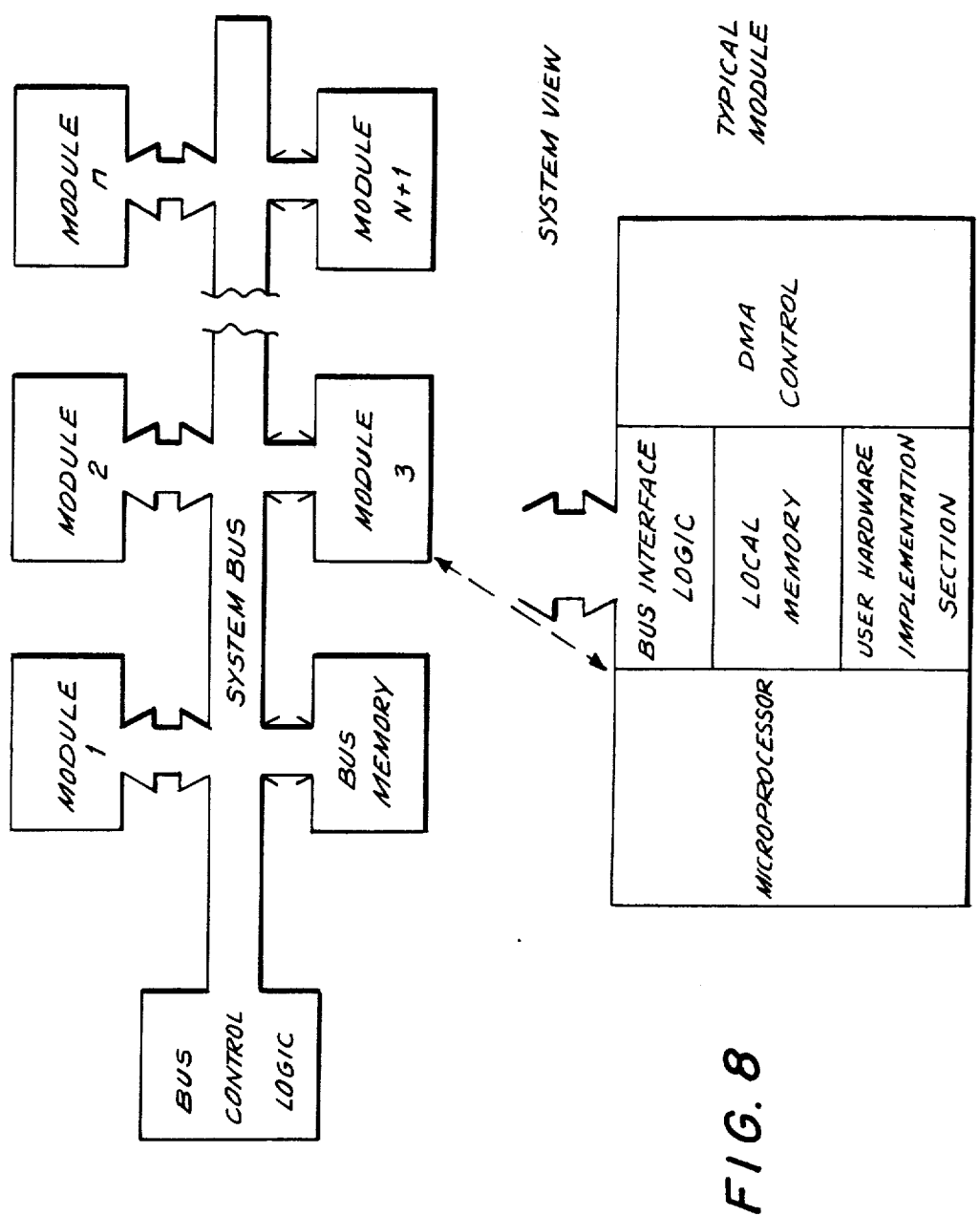
FIG. 8 is a block diagram of a system including a basic processor module in accordance with the invention.
Figure 9:
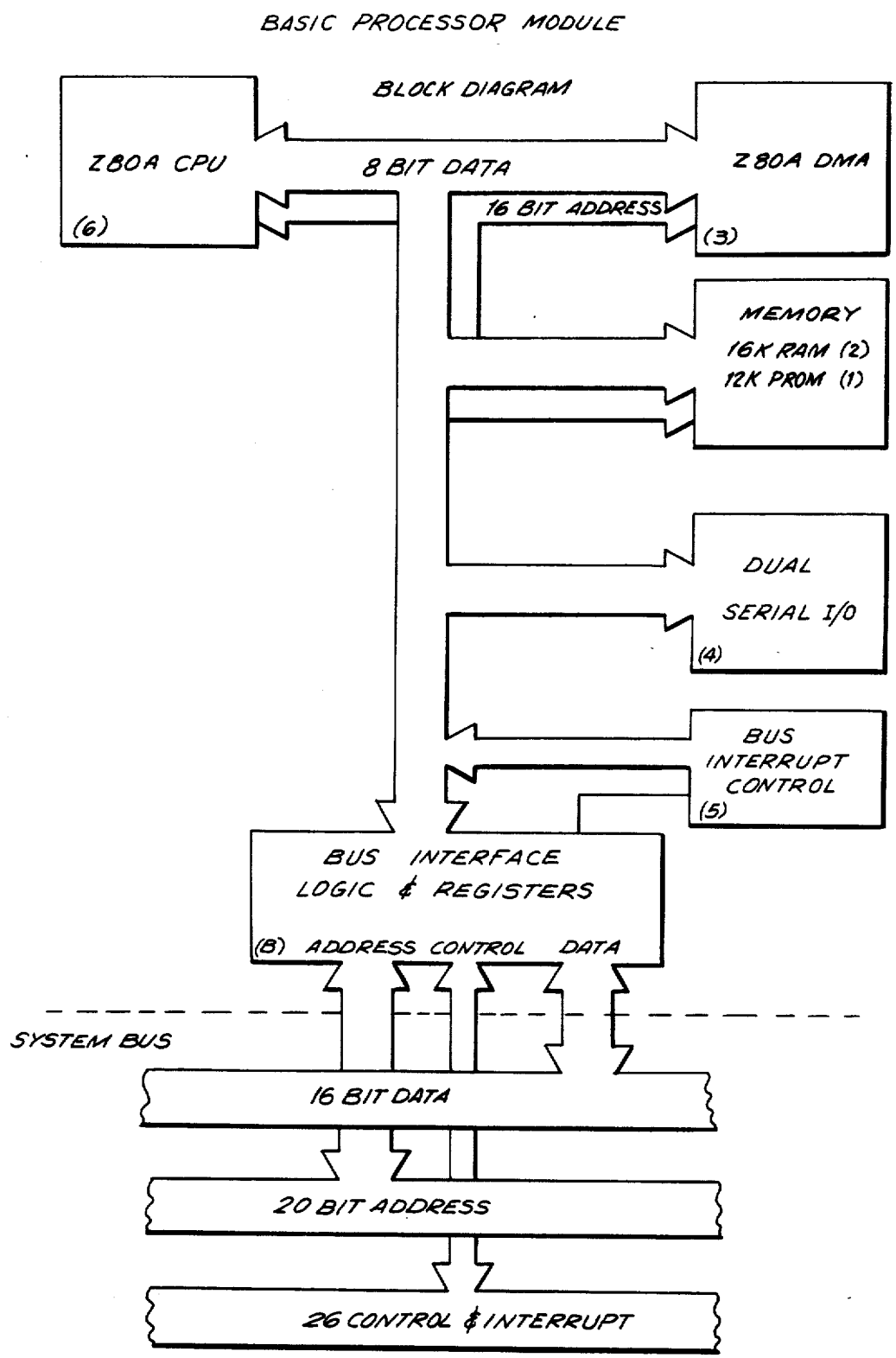
FIG. 9 is a functional block diagram of a basic processor module in accordance with the invention.
Figure 10:
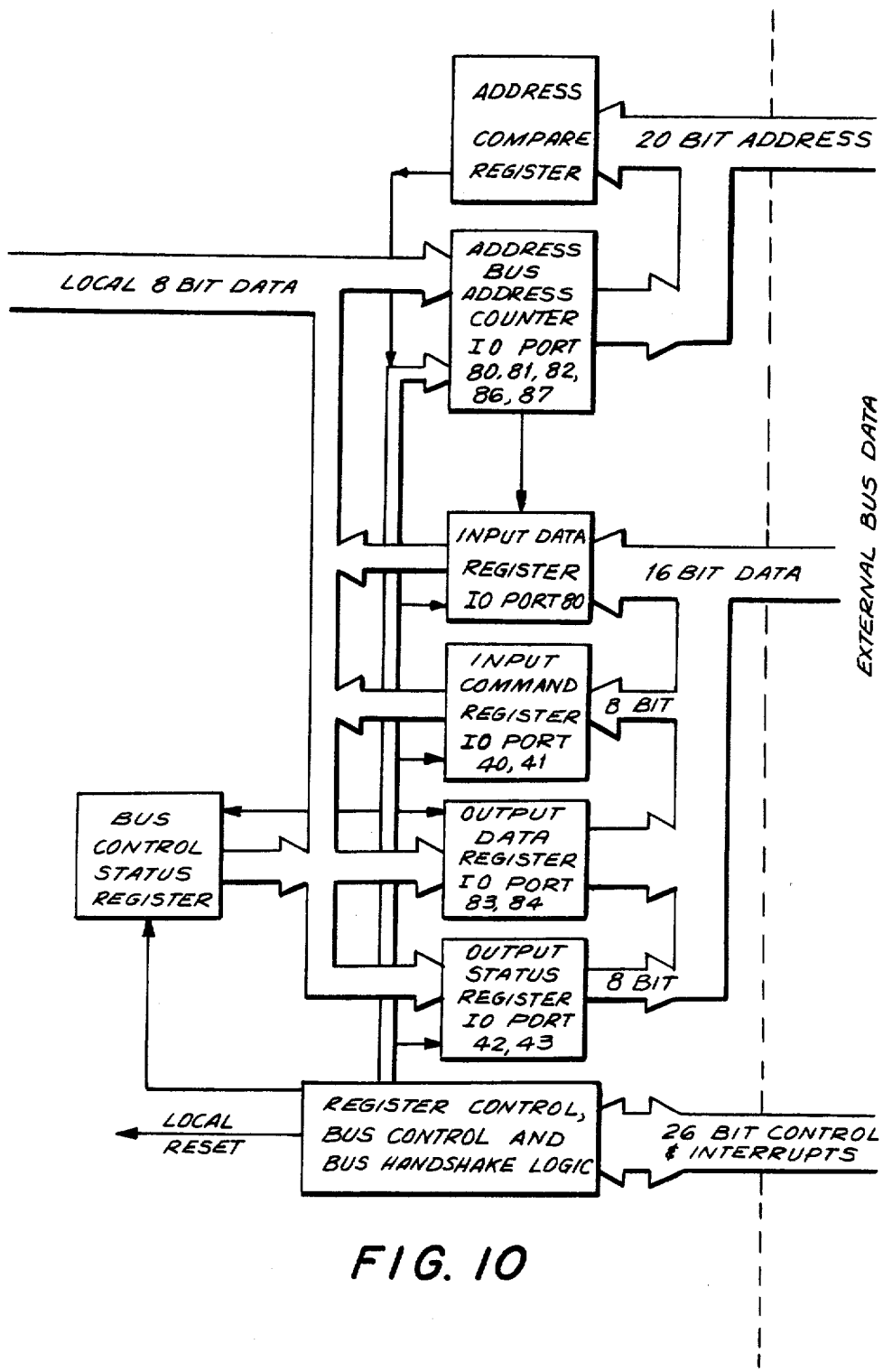
FIG. 10 is a functional block diagram of the bus interface logic and registers of FIG. 9.

The electronic processor module contains all of the electronics for controlling the graphic system. The electronics are packaged on individual PC boards. Each board plugs into a card cage with two connectors. One connector is a bus connector which connects the board to the other boards in the system via the system bus. The second connector is an IO connector which connects the boards to its IO device. The IO connector also contains the module's bus address selection. As shown in FIG. 7, each board in the electronic processor, except the bus controller, contains the local microprocessor 180. The local microprocessor 180 has its own memory 182 as well as a special purpose IO unit 184 as well as a system bus interface 186 and direct memory access 188. All the processor boards in the system have the same bus interface, microprocessor, DMA and bus interrupt control logic. The boards may differ in the amount of memory as well as in the nature of the special purpose IO section, but the boards are otherwise similar.

The bus controller board 52 is responsible for receiving bus requests, resolving concurrent request contentions and granting bus usage. The bus controller also has a bus time-out timer which detects bus cycles which are longer than preset periods of time, such as 13 microseconds, and forces their completion. If a bus time-out occurs, the bus controller saves the addresses of the master board which has been granted bus usage and the destination with whom the master was attempting to communicate.

The basic processing module 50 contains a local microprocessor and memory, system bus interface, DMA controller and two serial IO channels, as shown in FIG. 7. The local microprocessor operates independently of the system bus and only uses the system bus when it is desired to communicate with some other part of the system. The local microprocessor handles data transfers to and from the two serial channels either under DMA or program control.

The serial ingest part 44 has the same architecture as the basic functional control module 50 except that its special IO section interfaces the image acquisition units in addition to the two serial input/output channels. The ingest part 44 uses one of its serial IO channels to send commands and receive status to or from the fiche handling processor inside the image acquisition system IAS. The other channel is used to send characters for display on the CRT 74 and received characters from the 16 key keyboard 76, shown in FIG. 4. Both the CRT 74 and keyboard 76 are for image acquisition operator communication. The ingest board IO section also drives an 8 bit bi-directional data bus which is used to set up the speed control of the scan table motor and read the limit switch status (See FIG. 4). The digitized image data received in serial format by the ingest part IO section is converted to 8 bit parallel bytes and transferred either into local memory or directly into the system bus interface.

The disk interface module 60 has the same architecture as shown in FIG. 7 except that its special IO section has a parallel interface to a disk controller instead of two serial IO channels. The disk interface module receives image data from the system bus interface, buffers local memory and transfers it to the disk controller 64 for recording onto the disk 66. Data read from the disk 66 are received, buffered, and then transferred via the system bus interface to some other port. The local microprocessor generates all disk commands and reads the disk status after each transfer. Images on the disk are numbered 1-N, and the local microprocessor maintains a location map that translates a request for a certain image into a disk cylinder address. By way of example, on a 10 megabyte disk, each image occupies 20 cylinders.

The high speed serial output module 68 has the same architecture as shown in FIG. 7 except that its special IO section has a high speed serial synchronous interface instead of the two lower speed serial channels. This module 68 can drive up to 16 work stations via its high speed serial channel. The high speed serial channel may operate at 2 megabytes per second. Image data for the graphic CRT 72 and alphanumeric data for the display CRT 74 are transmitted from the electronic system EPS to the work stations via the system bus 46. Each message has a destination address which is recognizable by one of the work stations. Messages from the work stations to the electronic system EPS contain alphanumeric data from the work station keyboard and contain a source address indicating which work station originated the message. The high speed serial channel is transformer coupled in work station and terminated at the last work station on the channel. Since the work stations graphic display can only display one quarter of a full image, a 4:1 PIXEL reduction is accomplished in the serial output module 28. This is done by a software deletion of every other scan line of data and by hardware masking of every other bit as the serial data is transmitted. This module can also accomplish quarter page expansion by transmitting the full resolution scan lines and PIXEL's in the quarter page area of interest.

The touch-screen, element 94 in FIG. 2c is used to input the XY address of the center of the expanded quarter page. This is to be displayed at 4 times enlargement on the high resolution graphic display CRT screen.

The high speed printer port 58 has the same architecture shown in FIG. 7 except that its special IO section has an IO design which makes the port compatible with a typical output printer such as available from RAPICOM Corporation, Versatec Corp. and others. The printer is set up to print 1728 pixel lines with 2,200 lines per page. This is the same format as the image is scanned. Therefore, the printer port can accept a full image from the ingest port 44 or the disk port 60. The printer typically prints an image in 9 seconds or less.

The fax transceiver port 56 has the same architecture as shown in FIG. 7 except that its special IO section used the protocol necessary to interface with commercially available digital facsimile transceivers either at 2,400/4,800 baud via a dial-up phone line or at 9,600/19,200 baud via a direct wire connection. This port's special IO section also contains a receive and transmit bit sequencer which assists the local microprocessor in decoding and encoding image data. The algorithm operarting in the bit sequencers in a run-length encoder per CCITT/3 standard. This allows the port to receive and transmit image from remote fax units.

The image acquisition system may include a plurality of different acquisition units, not shown. For instance, one unit can be set up to scan microformed images of 8½"×11" originals with a reduction factor of 1:24. This gives 1,728 Pixel's across the 8½" dimension and 2,200 lines down the 11" dimension for a total digital image of 3.8 megabits. A second unit can be set up to scan micrographic images of 11" by 14" originals or computer originated microfilm generated images with a reduction factor of 1:48. These latter images are rotated from the 24 magnification image by 180° and 1,728 Pixels are scanned across the 11" dimension while the 2,200 are down the 14" dimension. The digital image as a result is still 3.8 megabits.

In a preferred configuration, the following specific components and methods have been used and are described here merely to explain the functions of a practical system embodiment. Other commercial components such as controllers and disks obtainable from many other commercial vendors could be used to obtain the same benefits, if these components are arranged and employed as described below.

The disk controller 64 can be an XCOMP DCF 10 controller. The DCF 10 controls a CDC 9414 fix media 10 megabyte disk drive 66. The disk is formated per track in 24 sectors with 256 bytes per sector, and four tracks per cylinder. This allows the controller to transfer up to four tracks of information without stepping ahead to the next cylinder. Four tracks of data can be transferred to or from the disk and the head steps to the next cylinder in 5 disk revolutions. Since one image occupies 20 cylinders and one disk revolution takes 25 milliseconds, the time required to transfer one image to or from the disk is 2.5 seconds.

The programming for the basic processor modules, such as shown in FIG. 7, is within the skill of the art with respect to the nature and functions of such devices. By way of example, however, and without any intent to be limiting, the actual functional specification of such a processor module is described in full in the attached appendix A, entitled, "Basic Processor Module Software Specification," the disclosure of which is specifically incorporated by reference.

3. The Display Workstation System.

The general system of FIG. 2c has been described previously. The high-speed data module 102, high-speed port 76, disc controller 98, etc., are all processor-based modules of the type shown in FIG. 7. Although only a single workstation is shown, it will be understood that the electronic processor system EPS is functionally operable with a plurality of such workstations. It will be further understood that the use of common system bus architecture and common base microprocessor systems allows multiple workstations to be compatible with each other without the need for buffering or extensive interfacing.

Other variations and modifications will be apparent to those skilled in the art. For example, the techniques employed to scan microfiche can be transposed for the scanning of other media. Also, encoding techniques are equally applicable to other types of scanned media aside from microfiche. Further, use of data encoded as provided herein can be applied to the creation of additional media of diverse form. In addition, the modularization described herein permits combinations of diverse image-acquisition systems to be employed, as well as additional electronic processing systems and to handle the increased capacity. With additional workstations, an extensive communications network can be built up to a high degree.

Further variations, modifications, additions or deletions will be apparent to those skilled in the art, within the spirit and scope of the appended claims.

Basic Processor Module Software Specification

Table of Contents

I. SYSTEM OVERVIEW
  A. Z80 Microprocessor System
    1. Memory Type and Location
    2. Power Up and Reset
    3. DMA Controller
      a. Operating Modes
        (1) Local Data Transfers
        (2) DMA Slave System Bus Reads
        (3) DMA Master System Bus Reads
        (4) DMA Operation Notes
    4. Serial Communications
    5. Vectored External Interrupts
  B. The SYSTEM BUS Interface
    1. Output Data Register
    2. Input Data Register
    3. Bus Address Counter Register
    4. Input Command Register
    5. Output Status Register
    6. Bus Control Status Register
    7. Command and Status Register Notes
    8. Bus Timeout
    9. I/O Map
    10. Memory Map I. System Overview The basic processor module was designed for use in a bussed multimodule environment. Each module on the SYSTEM BUS has the capability to communicate with other modules on the SYSTEM BUS. The bus contains a 20 bit wide address bus for either I/O or memory and a 16 bit wide data bus. To accommodate multiple intelligent processors, the SYSTEM BUS contains bus arbitration logic for resolving multiple bus accesses.

Each module contains a direct memory access circuit for high speed SYSTEM BUS transfers.

Basic Processor Module general description;
  The module features are:
    1. Z80 Microprocessor System
      a. 12K words of PROM
      b. 16K words of Dynamic RAM
      c. Z80 DMA Controller
      d. Dual Serial I/O with:
        Asynchronous protocol
        Synchronous protocol
        Programmable baud rates
      e. Z80 Vectored Interrupt Structure
      f. Z80 CPU
    2. Intel Multibus Multimaster Compatibility including:
      a. 20 bit address bus
      b. 16 bit data bus
      c. Multibus compatible bus control/handshake signals FIG. 2 is a block diagram of the COP. The numbers in the lower left of each function block correspond to the general description outline numbers above.

A. Z80 Microprocessor System

1. Memory Type and Location

The basic Processor Module is implemented using a Z80 microprocessor with local memory. This memory consists of:

16K words of RAM located at address C000-FFFFH
12K words of PROM located at 0000H-2FFFH 2. Power Up and Reset Upon power up (reset) the microprocessor does a jump to memory address 0000 where a PROM resident program must be supplied. This initialization program should contain routines to:

a. Initialize the Z80A-CTC for baud rates in channel 0 and channel 1, and system bus interrupts in channel 2 and channel 3.

b. Setup the Z80A/SIO/1 control registers to enable data to be transmitted or received.

c. Set up the Z80A-PIO control registers to enable the 8 bit command and status registers.

Reset can be caused by the following:
Interruption of the 5VDC power
Pressing the system reset pushbutton
Receipt of a write command from the system bus to subchannel 2 (See Section B-3).

For system pushbutton reset and subchannel 2 reset, the microprocessor receives a non-maskable interrupt which forces the Z80A-CPU to restart to location 0066H.

TABLE 1

| Baud Rate | SIO Clock Mode | | | |
|---|---|---|---|---|
| | 1 | 16 | 32 | 64 |
| 50 | 40,000 | 2500 | 1250 | 625 |
| 75 | 26,667 | 1667 | 833 | 416 |
| 110 | 18,182 | 1136 | 568 | 284 |
| 150 | 13,333 | 833 | 416 | 208 |
| 300 | 6,667 | 416 | 208 | 104 |
| 600 | 3,333 | 208 | 104 | 52 |
| 1200 | 1,667 | 104 | 52 | 26 |
| 1800 | 1,111 | 70 | 35 | 17 |
| 2000 | 1,000 | 62 | 31 | 16 |
| 2400 | 833 | 52 | 26 | 13 |
| 3600 | 556 | 35 | 17 | 9 |
| 4800 | 416 | 26 | 13 | 6 |
| 7200 | 278 | 17 | 9 | 4 |
| 9600 | 208 | 13 | 6 | 3 |
| 19200 | 104 | 6 | 3 | x |

3. DMA Controller

The Z80A-DMA circuit is provided for transferring blocks of data (from 1 to 64K bytes) without directly using the microprocessor. These transfers can be between local memory, either serial I/O port, (A or B) and the system bus interfaces, in any paired combination. The microprocessor controls the DMA by IN and OUT instructions to I/O port 00. DMA status can also be read at I/O port 00.

Once the DMA controlled transfer is initiated by the microprocessor, the DMA transfer proceeds until conclusion without any further aid of the microprocessor. At the end of the transfer the DMA may interrupt the microprocessor to signal the end of a successful block transfer.

a. Operating Modes
There are three DMA data transfers available:
Local Data Transfers:
  (a) Memory to Memory
  (b) Memory or Local I/O ports to System Bus
  (c) Memory to Local I/O Ports
  (d) Local I/O Ports to Memory
DMA Slave System Bus Reads
DMA Master System Bus Reads
DMA Operation Notes
  (1) Local Data Transfers This mode is used in general operations involving local memory, local I/O ports, and during DMA writes to the System bus. In this mode the DMA-RDY function is enabled for system bus writes only. DMA-RDY does not allow the DMA to request control until any data previously written to the system bus has been accepted. DMA-RDY is not active during operation between local memory and local I/O ports. The local data transfer mode can be set by executing an OUT 85H,A instruction. The mode set is data independent; the data in register A may be any value.

(2) DMA Slave System Bus Reads

This mode is used when accepting DMA transfers from another module on the system bus. DMA-RDY is enabled for system bus reads. DMA-RDY does not allow the DMA to request control until there is a valid data word waiting to be read from the system bus input data register. The slave system bus read mode can be set by executing an OUT 8DH, A instruction. The mode set is data independent.

(3) DMA Master System Bus Reads

This mode is used only when performing a DMA read of system memory. DMA-RDY for system bus reads and a hardware "automatic Fetch Next Memory Location" are enabled. This mode can be set by execution of an out 9DH, A instruction. The mode set is data independent.

(4) DMA Operation Notes (a) The Z80A-DMA should be set in the Byte-at-a-time mode for any transfers involving the system bus. Operation in any other mode could result in CPU lockout and/or loss of memory refresh.

(b) The system bus destination address should be loaded prior to the start of DMA transfers involving the system bus (except for slave reads). See Section B-4.

(c) The system bus destination address should not be modified during a DMA transfer involving the system bus.

3. DMA Controller

The Z80A-DMA circuit is provided for transferring blocks of data (from 1 to 64K bytes) without directly using the microprocessor. These transfers can be between local memory, either serial I/O port, (A or B) and the system bus interfaces, in any paired combination. The microprocessor controls the DMA by IN and OUT instructions to I/O port 00. DMA status can also be read at I/O port 00.

Once the DMA controlled transfer is initiated by the microprocessor, the DMA transfer proceeds until conclusion without any further aid of the microprocessor. At the end of the transfer the DMA may interrupt the microprocessor to signal the end of a successful block transfer.

a. Operating Modes
There are three DMA data transfers available:
Local Data Transfers:
  (a) Memory to Memory
  (b) Memory or Local I/O ports to System Bus
  (c) Memory to Local I/O Ports
  (d) Local I/O Ports to Memory
DMA Slave System Bus Reads DMA Master System Bus Reads
DMA Operation Notes
(1) Local Data Transfers This mode is used in general operations involving local memory, local I/O ports, and during DMA writes to the System bus. In this mode the DMA-RDY function is enabled for system bus writes only.

4. Serial Communications

The serial I/O and baud rate generation use a Z80A-SIO/1 circuit and two channels of a Z80A-CTC circuit. Baud rate selection for SIO/1 channel A is accomplished using CTC channel 0. Baud rates for SIO/1 channel B are through CTC channel 1. These CTC channels should be in the counter mode. Corresponding time constant values for the CTC and SIO baud rate selects can be found in Table 1.

Table 2 describes the I/O port addresses for the SIO and the CTC.

5. Vectored External Interrupts

The COP provides for vectored external interrupt using channel 2 of the Z80A-CTC. The time constant register for this counter should be preset to 1 and the channel placed in the counter mode with a negative slope.

TABLE 2

| I/O Port | I/O Port Addresses Function |
|---|---|
| C0H | SIO A - Data |
| C1H | SIO A - Command |
| C2H | SIO B - Data |
| C3H | SIO B - Command |
| C4H | CTC 0 - Baud rates for SIO A |
| C5H | CTC 1 - Baud rates for SIO B |
| C6H | CTC 2 - Done Interrupt |
| C7H | CTC 3 - RTC |

Refer to appendix C for detailed information regarding the Z80A-CTC.

Refer to appendix D for detailed information regarding the Z80A-SIO/1.

B. The SYSTEM BUS Interface (See FIG. 3)

The SYSTEM BUS Interface consists of the address bus counter (20 bit, write only), input data register (16 bits, read only ), output data register (16 bits, write only), bus control status register (8 bits, read only), and the input command and output status registers (each 8 bits implemented using a Z80A-PIO). There is also an address compare register which performs module select and module subchannel selects.

1. Output Data Register

The output data register accepts two 8 bit bytes from the microprocessor or DMA and presents them to the SYSTEM BUS as a 16 bit word. The first byte comprises bits 0 thru 7 and the second byte bits 8 thru F of the 16 bit word. A hardware write inhibit will prevent the microprocessor or DMA from writing a second word (2 bytes) into the output data register until the first word has been accepted by the destination module on the SYSTEM BUS.

There are two write commands that will load the output data register. Output to bus memory (I/O port 83) will present the data to the SYSTEM BUS as memory data ($\overline{MWTC}$ active) and upon completion of the data transfer will increment the bus address counter. Output to bus I/O (I/O port 84) will present the data as I/O data ($\overline{IOWC}$ active) and the bus address counter will remain unchanged. The bus data transfer is initiated after the second byte of the 16 bit word has been loaded into this output data register.

2. Input Data Register

The input data register accepts a 16 bit data word from the system data bus and presents them to the microprocessor or DMA at I/O port 81H as two consecutive 8 bit bytes. The first byte represents bits 0 thru 7 and the second byte 8 through F. If there is a data word already loaded into the input data register and the microprocessor or DMA has not read the second byte, a hardware inhibit will prevent the input data register control logic from acknowledging the next data word that the bus attempts to write into the input data register. Since this has the effect of freezing up the system data bus, care should be taken to make sure that the input data register is kept enabled by reading incoming data as soon as possible. (See Section B-8) The input data register is enabled immediately after the second byte of the data word has been read.

3. Bus Address Counter Register

The Bus Address Counter Register holds the destination address of the data transfer. This transfer may be in the form of Bus I/O data or bus memory data. During memory data transfers, ($\overline{MWTC}$ or $\overline{MRDC}$ active) the 20 bit bus address counter represents one of 220 memory address locations on the SYSTEM BUS. During I/O data transfers, ($\overline{IOWC}$ or $\overline{IORC}$ active) bits, 0, 1, 2 represent the module subchannel function and bits 3 thru 8 represent one of 64 module locations on the SYSTEM BUS.

The module subchannel functions are as follows:
SC0: 16 bit data port writes
SC1: Command or status port reads and writes
SC2: Module Reset-Hardware reset line to Z80
SC3 thru SC7: Not used The bus address counter register is automatically incremented at the completion of a memory transfer ($\overline{MRDC}$ or $\overline{MWTC}$ active) and remains unchanged for an I/O transfer ($\overline{IOWC}$ or $\overline{IORC}$ active). The bus address counter register can be loaded in any one of three methods. In all three modes address bits 8 thru F are loaded by doing a write to I/O port 86H. Address bits 10H thru 13H are loaded by writing into the lower 4 bits of I/O port 87H. The difference comes in loading address bits 0 thru 7, the least significant byte of the address.

A write to I/PO ports 80H loads address bits 0 thru 7 and causes no bus action.

A write to I/O ports 81H loads address bits 0 thru 7 and causes a SYSTEM BUS I/O read from the location pointed to by the bus address counter. The data resulting from this read is deposited into the input data register.

A write into I/O port 82 loads address bits 0 thru 7 and causes a SYSTEM BUS memory read from the location pointed to by the bus address counter. The data resulting from this read is deposited into the input data register and the bus address counter is incremented.

4. Input Command Register

The input command register is an 8 bit register which is loaded with data from the least significant byte (bits 0 thru 7) of the SYSTEM BUS. If set up (through I/O port 41H), when the input command register is loaded an interrupt will be issued to the microprocessor. The input command register is loaded when another module does a SYSTEM BUS I/O write to subchannel 1. The contents of the input command register may be read by the microprocessor or DMA at I/O port 40H.

5. Output Status Register

The output status register is an 8 bit register that is loaded by the microprocessor or DMA I/O port 42H. When the microprocessor or MDA writes a data word into the status register and bit 7 is set, the DONE INT is sent to the SYSTEM BUS. The DONE INT is released when the module acknowledging the DONE INT reads the output status register (via a SYSTEM BUS I/O read to subchannel 1).

6. Bus Control Status Register

The Bus Control Status Register is a multi-function register used for SYSTEM BUS communications with the Z80A microprocessor.

| Bit | Function |
| --- | --- |
| 0 | Module |
| 1 | Current System |
| 2 | Bus Address |
| 3 | |
| 4 | |
| 5 | Bus Lock |
| 6 | Output Data Register Busy |
| 7 | Input Data Register Filled |

Bits 0 thru 7 contain the SYSTEM BUS address at which this module resides. The data appears in the true condition.

| I/O Port | | Function |
| --- | --- | --- |
| 43 H | PIOB-COMMAND | Output Status Register Control |

Refer to Appendix E for detailed information regarding Z80A-PIO.

8. Bus Timeout

But timeout is a condition that occurs when a module that is in control of the SYSTEM BUS fails to release control. This can be caused by module A attempting to write two data words into the input data register of module B. If module B fails to read the first data word, bus lock will occur when module A attempts to write the second data word. This happens because the module B's input data register control logic is prevented from acknowledging the second data word until the first data word has been read. Since this lockup could be maintained indefinitely, a module is allowed to control the bus for only 12.8 micro-seconds at a time. After this time limit, bus timeout is declared by the SYSTEM BUS control module. The SYSTEM BUS control issues a "dummy" acknowledge to module A in an effort to free the SYSTEM BUS. If this action does not free the bus within 6.4 micro-seconds, bus lock is declared and all further SYSTEM BUS transactions are suspended. The state of bus lock can be tested at any time by reading the Bus Control Status Register Bit 5 (I/O port 80H).

| MEMORY MAP | | | | | |
| --- | --- | --- | --- | --- | --- |
| HEX ADDR | MEMORY TYPE | | HEX ADDR | OP CODE | I/O MAP I/O MAP FUNCTION |
| 0000 | BLK0 | PROM | 00 | I/O | Z80A-DMA* |
| 0800 | BLK1 | | 40 | I/O | Z80A-PIO* Channel A - Data |
| 1000 | BLK2 | | 41 | I/O | Z80A-PIO* Channel A - Command |
| 1800 | BLK3 | | 42 | I/O | Z80A-PIO* Channel B - Data |
| 2000 | BLK4 | | 43 | I/O | Z80A-PIO* Channel B - Command |
| 2800 | BLK5 | | 80 | O | LDAL Load Bus Address Low Byte |
| 3000 | BLK6 | | 81 | O | LDAL IO Load Bus Address Low Byte w/IO Read |
| 3800 | BLK7 | | 82 | O | LDALMEM Load Bus Address Low Byte w/MEM Read |
| 4000 | NOT | | 83 | O | Write to Bus Memory with Auto INCR ADDR |
| 7FFF | USED | | 84 | O | Write to Bus IO |
| 8000 | RAM | | 85 | O | DMA Enable System Bus Write & Local DMA Read/Write |
| BFFF | | | 8D | O | Enable DMA "Slave" System Reads |
| C000 | NOT | | 9D | O | Enable DMA "Master" System Reads |
| FFFF | USED | | 86 | O | LDADM Load Address Middle Byte |
| | | | 87 | O | LDADH Load Address High Byte |
| | | | 80 | I | Start RD Bus Control Status Register |
| | | | 81 | I | Read Data From Bus |

*See Product Specifications for Assignment Details
I = Z80 OP Code In Operation
O = Z80 OP Code Out Operation Bit 5—a one implies bus lock (see section B8).
Bit 6—a one implies output data register is busy.
Bit 7—a one implies input data register contains valid data.

7. Command and Status Register Notes

The input command register and the output status register are both implemented in a Z80A-PIO circuit. The A side of the Z80A-PIO is the input command register and should be set to mode 1 (input). The B side is the output status register and should be in mode 0 (output). The following are the Z80A-PIO functions:

| I/O Port | | Function |
| --- | --- | --- |
| 40 H | PIOA-DATA | Input Command Register |
| 41 H | PIOA-COMMAND | Input Command Register Control |
| 42 H | PIOB-DATA | Output Status Register |

We claim:

1. An information system for storage, retrieval, and generation of information from a plurality of multimedia sources, comprising an image-acquisition system, an electronic processing system, and a display workstation having a plurality of output modules, said electronic processing system including a serial input port module for receiving data from said image-acquisition system and coupling said data onto a local system bus, a program module coupled to said bus for directing the sequence and flow of information between said image-acquisition system and said display workstation via said electronic processing system, said workstation output modules being coupled to said bus, a functional control module coupled to said bus for controlling priority of operation of said workstation output modules coupled to said bus whereby said control module handles bus contention problems, a redundancy reduction module coupled to said bus for controlling the digital data rate of transfer of data through said bus, and a plurality of output port modules coupled to said bus for accessing various additional output modules including memory and communication modules.

2. The system of claim 1, wherein all of said output modules have I/O ports and are connected to a second system bus, and wherein a microprocessor module connected to said second bus includes a microprocessor, a memory, a direct memory access, I/O ports, and bus interrupt control, said second system bus including data lines, address lines, control lines and interrupt lines, said I/O ports of all of said output modules differing from one another to enable distinguishing the respective assigned module function, each said output module being otherwise identical, thereby facilitating ease of expansion and modification.

3. The system of claim 2 wherein said redundancy reduction module includes means responsive to redundant data strings from said image-acquisition system for producing a shortened code word, thereby reducing said redundant data.

4. The system of claim 2, wherein said system bus is further coupled to a facsimile transceiver.

5. The system of claim 1, wherein said workstation further comprises a local bus, a processor module coupled thereto, a plurality of output ports coupled to said bus including high and low-speed ports, an alphanumeric keyboard coupled to said bus, and local memory means coupled to said bus, said keyboard and said memory means cooperating with said processor module for controlling access to said ports.

6. An information system for the storage, retrieval, and generation of information for a plurality of multimedia sources, the system elements comprising image-acquisition means, electronic processing means, and a display workstation, said display workstation including two display screens, the first screen for display of high-resolution graphics, the second screen for display of alphanumeric characters, said electronic processing system disposed to process images acquired by said image-acquisition system, said display workstation disposed to display graphics derived from said processed images, said workstation further comprising a local bus, a processor module couped thereto, a plurality of output ports coupled to said bus including high and low-speed ports, an alphanumeric keyboard coupled to said bus, and local memory means coupled to said bus, said keyboard and said memory means cooperating with said processor module for controlling access to said ports, said system elements being connected to a system bus; each of said system elements including at least one microprocessor module, a memory, a direct memory access, I/O ports, and bus interrupt control; said local bus including data lines, address lines, control lines and interrupt lines; said electronic processing means comprising a plurality of individual modules interfacing with said image-acquisition means and said display workstation, each of said individual modules having means for locally controlling said system, said individual modules being substantially identical.

7. System of claim 6, wherein said image-acquisition means comprises a plurality of storage media and said display station comprises a plurality of reproduction media, an instruction entry means for receiving instructions including retrieval instructions and reproduction instructions for said system, means responsive to any such entered instructions for selecting a desired storage medium from said plurality of media in accordance with any such retrieval instructions and for selecting a desired one of said reproducing media in accordance with any such reproduction instructions, means for incrementing scanning of said selected storage medium to produce a relatively high speed stream of data signals, means for converting said data signals to digital form, means for changing the rate of data flow of said stream of data signals in accordance with said selected reproduction instruction requirements, means for reducing the data flow of said data signals without reducing the information content, and means for transmitting said reduced data flow to said selected reproduction medium in accordance with said entered instructions, said reproduction medium reproducing a selected image from said data flow.

8. The system of claim 7, wherein said data signals are video data signals and further comprising a preview screen, said preview screen coupled to said video data signals for permitting the operator to view the data derived from said selected storage medium prior to transmission for reproduction, said video data signals including image signals, and wherein said means for scanning includes means for centering the image resulting from said image signals prior to scanning.

9. The system of claim 8, wherein said means for scanning includes a linear array of charge-coupled elements, a scan table, means for projecting an image of said storage medium onto said scan table, and means for together driving said linear array and said scan table through a projected image of said medium while said medium and its image remain stationary, thereby scanning said image, and further including limit switches positioned with respect to said table and de-energizing said driving means upon activation, for limiting the movement of said table.

10. The system of claim 9, further including a motor, said scan table and said array being driven by said motor through a flexible coupling connecting said motor to said table and said array, an angular resolver, said table and array including a further flexible coupling connected to said angular resolver for providing a location data signal corresponding to the precise location of said linear array, means responsive to said location data signal for enabling said linear array to be strobed across an entire line of said image, transverse to the drive direction, before moving to the next sequential line position on a scanned frame of said projected medium.

11. The system of claim 9, wherein said means for scanning scans on a line-by-line basis, and includes means for compacting said data, said means for compacting operating on a scan-line by scan-line basis, and wherein said means for scanning includes a line buffer for loading and unloading data on a scan-line by scan-line basis, means for sensing the unloading rate of said buffer, said means responsive to said rate for transmitting a scan-speed control signal to means controlling the rate of scan, said means for sensing responsive to a high pre-set unloading rate condition of said buffer for slowing said scan rate and to a low pre-set unloading rate condition of said buffer for speeding up said scan rate.

12. The system of claim 8, wherein said means for converting said data signals further includes analog to digital converter means, including first means for converting said digital signals to a series of binary ones and zeroes in accordance with each of one of sixteen steps of gray scale, and said scanning means further comprising a plurality of image cells and reference cell means, means for comprising signals from each successive image cell of said scanning means to signals from said reference cell means, said reference means signal serving as a zero gate value, said first means responsive to data from said signal comparing means and recognizing a one as being two or more gray value steps above the zero gate value, and a zero as all other data, said recognized zeroes and ones thus accomplishing said analog to digital conversion.

13. The system of claim 8, wherein said data signals are converted to strings of data bits and wherein data reduction by one-fourth is accomplished by means for masking every other data bit, said masking means further reducing data by deleting every other scan line.

14. The system of claim 13, further including means for expansion of said data by transmission of all of said masked and deleted data bits.

15. The system of claim 6, wherein said display workstation further includes a touch panel coupled thereto for interactive graphic manipulation of said displayed graphics.

* * * * *